US012164293B2

(12) United States Patent
Nakano et al.

(10) Patent No.: US 12,164,293 B2
(45) Date of Patent: Dec. 10, 2024

(54) REMOTE OPERATION DEVICE AND REMOTE OPERATION METHOD

(71) Applicant: Mitsubishi Electric Corporation, Tokyo (JP)

(72) Inventors: Hisao Nakano, Tokyo (JP); Makoto Takeda, Kobe (JP); Takuya Kono, Tokyo (JP); Akihiro Sanada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 283 days.

(21) Appl. No.: 17/781,204

(22) PCT Filed: Dec. 25, 2019

(86) PCT No.: PCT/JP2019/050746
§ 371 (c)(1),
(2) Date: May 31, 2022

(87) PCT Pub. No.: WO2021/130880
PCT Pub. Date: Jul. 1, 2021

(65) Prior Publication Data
US 2022/0413489 A1    Dec. 29, 2022

(51) Int. Cl.
*G05D 1/00*    (2006.01)
(52) U.S. Cl.
CPC ......... *G05D 1/0022* (2013.01); *G05D 1/0016* (2013.01); *G05D 1/0038* (2013.01)
(58) Field of Classification Search
CPC .. G05D 1/0022; G05D 1/0016; G05D 1/0038; H04W 4/44

(Continued)

(56) References Cited

U.S. PATENT DOCUMENTS

| 4,697,179 A | 9/1987 | Arimitsu et al. |
| 2018/0091407 A1* | 3/2018 | Tervonen .............. H04L 43/103 |
| 2021/0197808 A1* | 7/2021 | Maeda ................ B60W 60/005 |

FOREIGN PATENT DOCUMENTS

| JP | 60-203029 A | 10/1985 |
| JP | 2006-301723 A | 11/2006 |

(Continued)

OTHER PUBLICATIONS

Office Action issued Aug. 30, 2022 in Japanese Application No. 2021-566622.

(Continued)

*Primary Examiner* — Muhammad Shafi
(74) *Attorney, Agent, or Firm* — Sughrue Mion, PLLC; Richard C. Turner

(57) ABSTRACT

A remote operation device that remotely operates a mobile object by communication includes processing circuitry configured to acquire information on non-prime remote operation devices that are allowed to remotely operate the mobile object by the communication; detect a communication delay time in the communication with the mobile object; determine whether or not the detected communication delay time exceeds a delay time determination threshold; determine, when it is determined that the communication delay time exceeds the delay time determination threshold, a switching destination remote operation device from among the non-prime remote operation devices depending on whether or not a switching determination condition is satisfied on a basis of the acquired information on the non-prime remote operation devices; and output switching instruction information for remotely operating the mobile object to the determined switching destination remote operation device.

5 Claims, 12 Drawing Sheets

(58) Field of Classification Search
USPC .............................................................. 701/2
See application file for complete search history.

(56) References Cited

FOREIGN PATENT DOCUMENTS

| JP | 2016-18238 A | 2/2016 |
| JP | 2018-77649 A | 5/2018 |
| WO | 2019/077739 A1 | 4/2019 |
| WO | WO-2019-077739 | * 4/2019 |

OTHER PUBLICATIONS

International Search Report for PCT/JP2019/050746 dated Mar. 17, 2020 (PCT/ISA/210).

* cited by examiner

FIG. 8
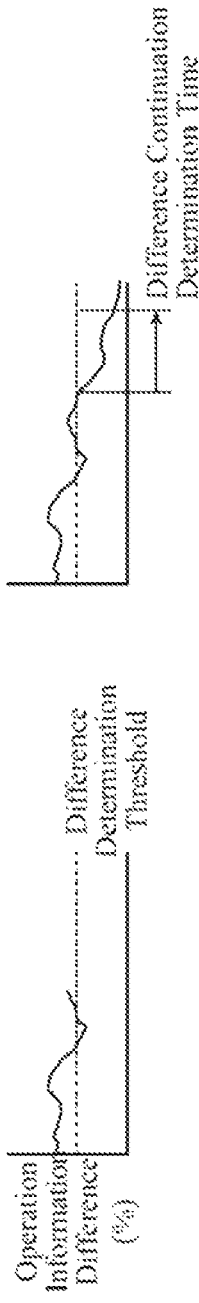
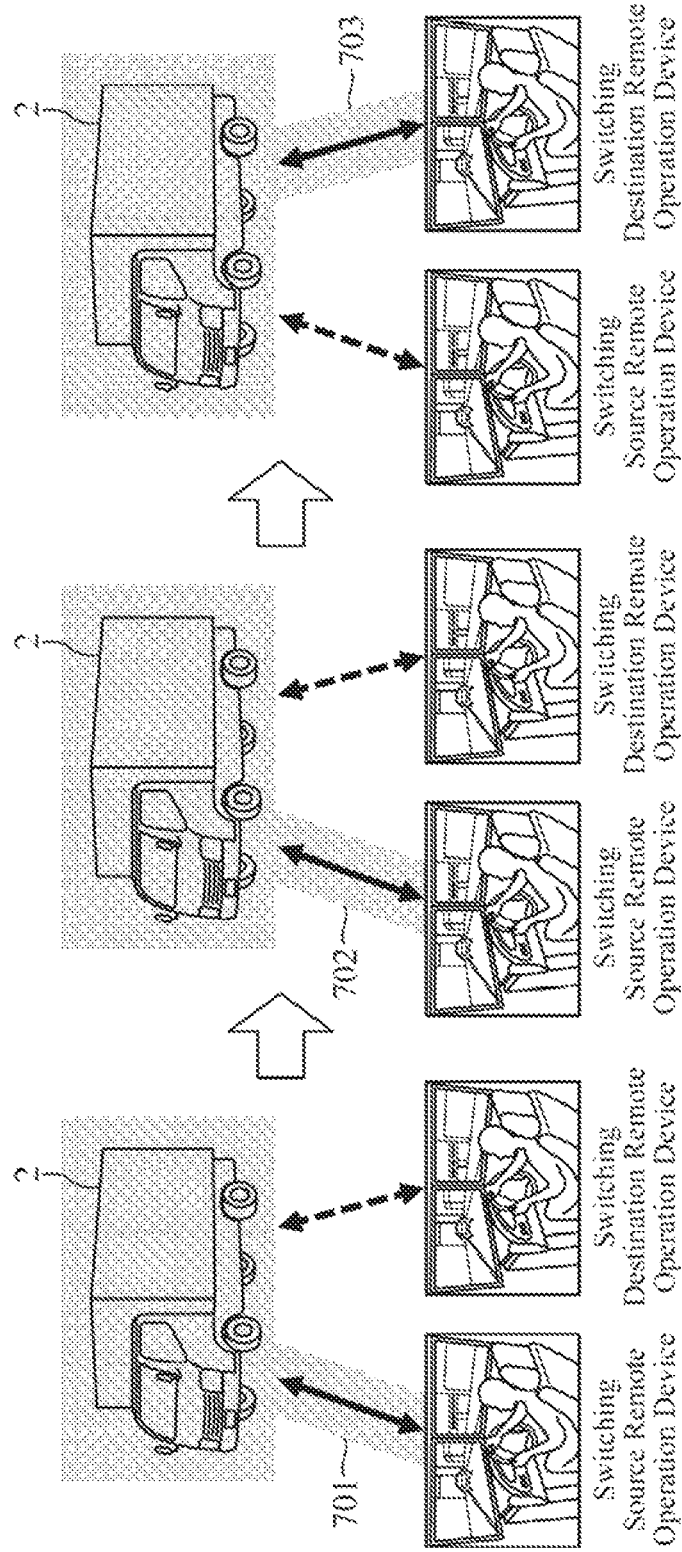

REMOTE OPERATION DEVICE AND REMOTE OPERATION METHOD

CROSS REFERENCE TO RELATED APPLICATIONS

This application is a National Stage of International Application No. PCT/JP2019/050746 filed Dec. 25, 2019.

TECHNICAL FIELD

The present invention relates to a remote operation device that remotely operates a mobile object, and a remote operation method.

BACKGROUND ART

In recent years, development of driving (hereinafter referred to as "remote driving") assist services by remote operation for mobile objects has been expected. In the remote driving, it is required to maintain a state in which the remote driving is normally performed.

As a technique for maintaining remote driving in a case where an operator who performs remote operation of a mobile object falls into a state in which the operator cannot continue the remote operation while operating the mobile object, for example, Patent Literature 1 discloses a remote operation system that acquires a state of the operator during operation and switches the operator of the mobile object to another operator depending on the acquired state.

CITATION LIST

Patent Literature

Patent Literature 1: JP 2006-301723 A

SUMMARY OF INVENTION

Technical Problem

The remote operation of the mobile object is performed by communication. There is a constant communication delay in communication for performing a remote operation of a mobile object, but there is a problem that the communication delay may increase to such an extent that a state in which the remote driving is normally performed cannot be maintained.

In the technique as disclosed in Patent Literature 1, it is not considered that a communication delay that is too large to maintain a state in which remote driving is normally performed can occur in communication for performing a remote operation of a mobile object. Therefore, in the technique as disclosed in Patent Literature 1, the above-described problem has not been solved yet.

The present invention has been made to solve the above problems, and an object of the present invention is to provide a remote operation device which prevents that a communication delay present in the communication for performing the remote operation of the mobile object increases to such an extent that a state in which the remote driving is normally performed cannot be maintained, and thus the state in which the remote driving is normally performed cannot be maintained.

Solution to Problem

According to the present invention, a remote operation device that remotely operates a mobile object by communication includes processing circuitry configured to acquire information on non-prime remote operation devices that are allowed to remotely operate the mobile object by the communication; detect a communication delay time in the communication with the mobile object; determine whether or not the detected communication delay time exceeds a delay time determination threshold; determine, when it is determined that the communication delay time exceeds the delay time determination threshold, a switching destination remote operation device from among the non-prime remote operation devices depending on whether or not a switching determination condition is satisfied on a basis of the acquired information on the non-prime remote operation devices; and output switching instruction information for remotely operating the mobile object to the determined switching destination remote operation device.

Advantageous Effects of Invention

According to the present invention, it is possible to prevent that the communication delay present in the communication for performing the remote operation of the mobile object increases to such an extent that the state in which the remote driving is normally performed cannot be maintained, and thus the state in which the remote driving is normally performed cannot be maintained.

BRIEF DESCRIPTION OF DRAWINGS

FIG. 3A is a diagram for explaining information acquired by the acquisition unit in a state before switching of the remote operation device occurs. FIG. 3B is a diagram for explaining information acquired by the acquisition unit in a case where the state illustrated in FIG. 3A is changed to a state where the switching of the remote operation device 1 occurs. FIG. 3C is a diagram for explaining information acquired by the acquisition unit in a state where the switching of the remote operation device has occurred from the state illustrated in FIG. 3B.

FIG. 8 is a diagram for explaining an example of switching when the remote operation device for remotely operating a vehicle is switched as described in the flowchart of FIG. 7 in the first embodiment.

DESCRIPTION OF EMBODIMENTS

Hereinafter, an embodiment of the present invention will be described in detail with reference to the drawings.

First Embodiment

Figure 1:
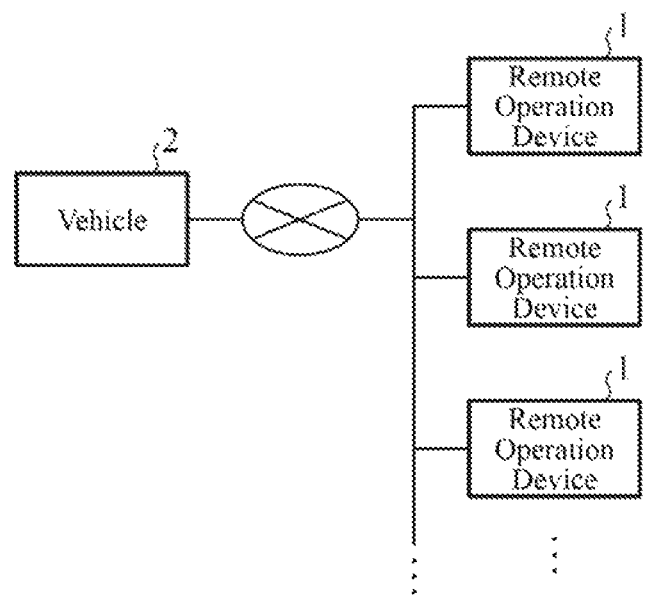
FIG. 1 is a diagram illustrating a configuration example of a remote operation system including a remote operation device according to a first embodiment.

FIG. 1 is a diagram illustrating a configuration example of a remote operation system including a remote operation device 1 according to a first embodiment.

The remote operation system is a system capable of providing services, such as a service in which an operator (hereinafter, referred to as a "remote operator") remotely operates a vehicle 2 as necessary and causes the vehicle 2 to travel to a destination.

The remote operation system includes a vehicle 2 and a remote operation device 1. Although only one vehicle 2 is illustrated in FIG. 1, this is merely an example, and the remote operation system includes one or more vehicles 2. In addition, although three remote operation devices 1 are illustrated in FIG. 1, this is merely an example. The remote operation system includes a plurality of remote operation devices 1. A plurality of remote operation devices 1 can be connected to one vehicle 2. In the following first embodiment, a plurality of remote operation devices 1 are also simply referred to as "remote operation devices 1".

The remote operation device 1 can remotely operate the vehicle 2 by communication. Specifically, the remote operator operates the remote operation device 1 to remotely operate the vehicle 2 and remotely drive the vehicle 2. Since the technique for remotely operating the vehicle 2 by communication is an existing technique, detailed description thereof will be omitted. The remote operation device 1 may remotely operate the vehicle 2 using an existing remote operation technique. The remote operation device 1 is installed at an appropriate place such as an operation center present on the travel route of the vehicle 2. However, it is assumed that only one remote operation device 1 remotely operates one vehicle 2 at a time.

In the remote operation system, which remote operation device 1 among the plurality of remote operation devices 1 remotely operates the vehicle 2 first is appropriately determined. For example, the remote operation device 1 installed at a place closest to the current position of the vehicle 2 may be a remote operation device 1 that remotely operates the vehicle 2 first, or when there is a passenger in the vehicle 2, the passenger may designate a remote operation device 1 that remotely operates the vehicle 2.

In the remote operation system, when the remote operation device 1 that remotely operates the vehicle 2 is determined, the plurality of remote operation devices 1 that can communicate with the vehicle 2 can grasp the remote operation device 1 that is remotely operating the vehicle 2. Specifically, for example, when the remote operation device 1 that remotely operates the vehicle 2 is determined, the determined remote operation device 1 notifies the other remote operation devices 1 that can communicate with the vehicle 2 that the determined remote operation device 1 is remotely operating the vehicle 2. The other remote operation devices 1 grasp which remote operation device 1 is remotely operating the vehicle 2 by the notification. The remote operation devices 1 are connected to each other via a network.

When the remote operation device 1 determines that a communication delay requiring switching of the remote operation device 1 has occurred in communication between the remote operation device 1 and the vehicle 2 during remote operation of the vehicle 2, the remote operation device 1 performs switching so that another remote operation device 1 performs remote operation of the vehicle 2. In the first embodiment, the communication delay requiring switching of the remote operation device 1 refers to a communication delay that makes it impossible to maintain a state in which remote driving of the vehicle 2 is normally performed.

When the remote operation device 1 is switched, another remote operation device 1 performs remote operation of the vehicle 2. Specifically, a remote operator of the other remote operation device 1 operates the other remote operation device 1 to remotely operate the vehicle 2.

The remote operation device 1 that is remotely operating the vehicle 2 is also referred to as a "switching source remote operation device". In the following first embodiment, one or more remote operation devices 1 that are other than the "switching source remote operation device" and can be switched from the "switching source remote operation device" to become the remote operation device 1 that remotely operates the vehicle 2 when the "switching source remote operation device" cannot maintain the state in which the remote driving of the vehicle 2 is normally performed are also referred to as "candidate remote operation devices". In the following first embodiment, among the "candidate remote operation devices", a candidate remote operation device that is switched from the "switching source remote operation device" to remotely operate the vehicle 2 is also referred to as a "switching destination remote operation device".

When there are a plurality of candidate remote operation devices, the switching source remote operation device determines which candidate remote operation device is to be the switching destination remote operation device.

Figure 2:
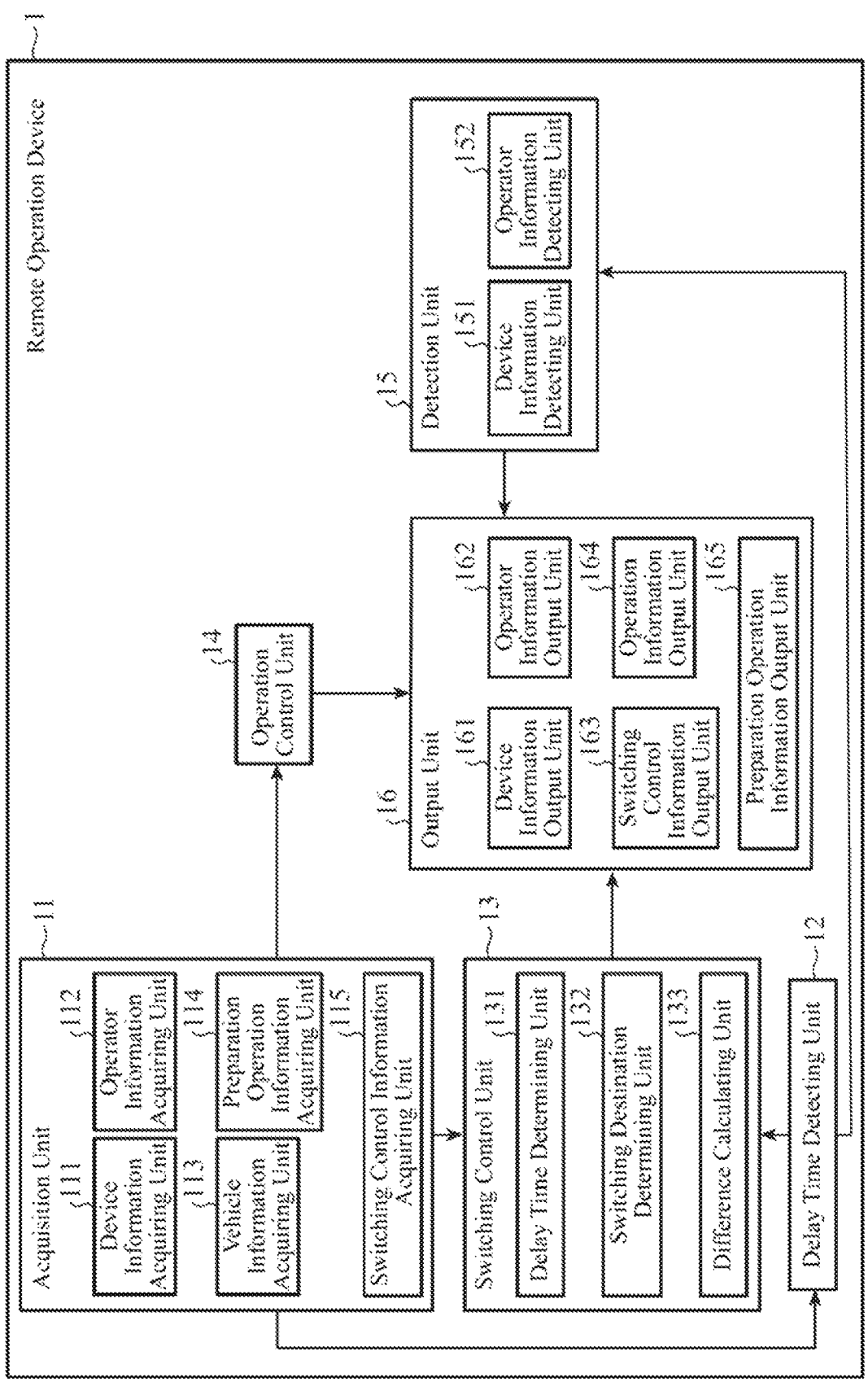
FIG. 2 is a diagram illustrating a configuration example of the remote operation device according to the first embodiment.

FIG. 2 is a diagram illustrating a configuration example of a remote operation device 1 according to the first embodiment.

In the first embodiment, in a case where the remote operation device 1 is a switching source remote operation device and also in a case where the remote operation device 1 is a candidate remote operation device, the remote operation device 1 has the same configuration in principle.

The remote operation device 1 is connected with the vehicle 2 and other remote operation devices 1 via a communication unit (not illustrated).

The remote operation device 1 includes an acquisition unit 11, a delay time detecting unit 12, a switching control unit 13, an operation control unit 14, a detection unit 15, and an output unit 16.

The acquisition unit 11 includes a device information acquiring unit 111, an operator information acquiring unit 112, a vehicle information acquiring unit 113, a preparation operation information acquiring unit 114, and a switching control information acquiring unit 115.

The switching control unit 13 includes a delay time determining unit 131, a switching destination determining unit 132, and a difference calculating unit 133.

The detection unit 15 includes a device information detecting unit 151 and an operator information detecting unit 152.

The output unit 16 includes a device information output unit 161, an operator information output unit 162, a switching control information output unit 163, an operation information output unit 164, and a preparation operation information output unit 165.

The acquisition unit 11 acquires various types of information.

For example, when the remote operation device 1 is a switching source remote operation device, the acquisition unit 11 acquires information on the candidate remote operation device from the candidate remote operation device. The information on the candidate remote operation device acquired by the acquisition unit 11 when the remote operation device 1 is the switching source remote operation device includes information on the state of the candidate remote operation device (hereinafter, referred to as "device state information") or information on the state of the remote operator operating the candidate remote operation device (hereinafter, referred to as "operator state information"). Specifically, the device information acquiring unit 111 of the acquisition unit 11 acquires the device state information, and the operator information acquiring unit 112 of the acquisition unit 11 acquires the operator state information.

The device state information includes, for example, information on a communication delay time in communication between the remote operation device 1 and the vehicle 2, information on whether or not the remote operation device 1 is being operated by a remote operator, or information on whether or not the remote operation device 1 is in a standby state. In the first embodiment, the remote operation device 1 is in the standby state means that, for example, the remote operation device 1 can be operated at any time as long as there is a remote operator who can operate the remote operation device 1.

The device information acquiring unit 111 may acquire the device state information of the candidate remote operation device from the candidate remote operation device by an appropriate method. For example, the device information acquiring unit 111 may request the device state information from the candidate remote operation device at a preset cycle, and acquire the device state information output from the candidate remote operation device in response to the request. Further, for example, in the candidate remote operation device, when there is a change in the state of the candidate remote operation device, the candidate remote operation device may output the device state information, and the device information acquiring unit 111 may acquire the device state information output by the candidate remote operation device.

Note that the candidate remote operation device detects the device state information. Specifically, in the candidate remote operation device, the device information detecting unit 151 of the detection unit 15 detects the device state information. Details of the device information detecting unit 151 will be described later.

The operator state information acquired by the operator information acquiring unit 112 includes, for example, information on whether or not the remote operator operating the remote operation device 1 is seated facing the remote operation device 1, information on whether or not the remote operator operating the remote operation device 1 is qualified to perform remote operation of the vehicle 2, or information on the health state of the remote operator operating the remote operation device 1.

The operator information acquiring unit 112 may acquire the operator state information on the remote operator of the candidate remote operation device from the candidate remote operation device by an appropriate method. For example, the operator information acquiring unit 112 may request the operator state information from the candidate remote operation device at a preset cycle, and acquire the operator state information output from the candidate remote operation device in response to the request. Further, for example, in the candidate remote operation device, when there is a change in the state of the remote operator of the candidate remote operation device, the candidate remote operation device may output the operator state information, and the operator information acquiring unit 112 may acquire the operator state information output by the candidate remote operation device.

Note that the candidate remote operation device detects the operator state information. Specifically, in the candidate remote operation device, the operator information detecting unit 152 of the detection unit 15 detects the operator state information. Details of the operator information detecting unit 152 will be described later.

Furthermore, for example, the acquisition unit 11 acquires information on the vehicle 2 (hereinafter referred to as "vehicle information") from the vehicle 2. Specifically, the vehicle information acquiring unit 113 of the acquisition unit 11 acquires the vehicle information. The vehicle information includes a traveling speed of the vehicle 2, information on an inter-vehicle distance from another vehicle 2, information on a current position of the vehicle 2, information on a destination of the vehicle 2, an image obtained by imaging the periphery of the vehicle 2 by an imaging device mounted on the vehicle 2, or the like. Note that the vehicle information acquiring unit 113 functions both in a case where the remote operation device 1 is a switching source remote operation device and in a case where the remote operation device 1 is a candidate remote operation device.

For example, in a case where the remote operation device 1 is the switching source remote operation device, the acquisition unit 11 acquires the preparation operation information from the switching destination remote operation device. Specifically, in a case where the remote operation device 1 is the switching source remote operation device, the preparation operation information acquiring unit 114 of the acquisition unit 11 acquires the preparation operation information from the switching destination remote operation device. The preparation operation information is operation information for remotely operating the vehicle 2 generated corresponding to switching preparation instruction information output from the switching source remote operation device in the switching destination remote operation device when the remote operation device 1 that remotely operates the vehicle 2 is switched from the switching source remote operation device to the switching destination remote operation device. Details of the operation information will be described later.

In addition, for example, in a case where the remote operation device 1 is the switching destination remote operation device, the acquisition unit 11 acquires the switching control information from the switching source remote operation device. Specifically, in a case where the remote operation device 1 is the switching destination remote operation device, the switching control information acquiring unit 115 of the acquisition unit 11 acquires the switching control information from the switching source remote operation device. The switching control information is information output from the switching source remote operation device when the remote operation device 1 that remotely operates the vehicle 2 is switched. In the first embodiment, the switching control information includes switching preparation instruction information for instructing the switching destination remote operation device to make a preparation for remotely operating the vehicle 2 and switching instruction information for instructing the switching destination remote operation device to switch to operate as the switching source remote operation device and actually remotely operating the vehicle 2.

Figure 3A:
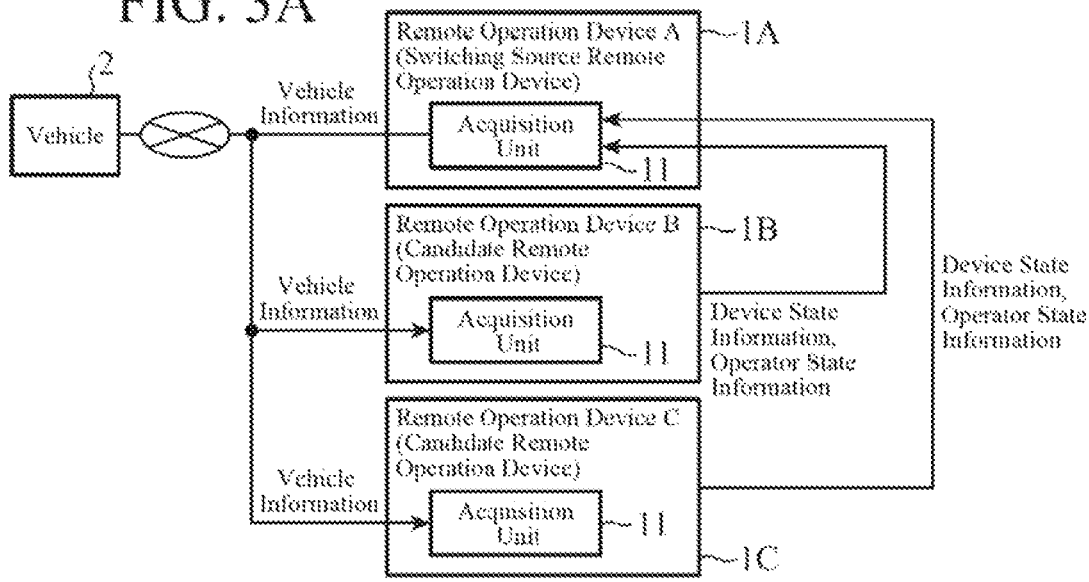
FIGS. 3A, 3B and 3C are diagrams for explaining information acquired by an acquisition unit of the remote operation device in the remote operation system according to the first embodiment.
Figure 3B:
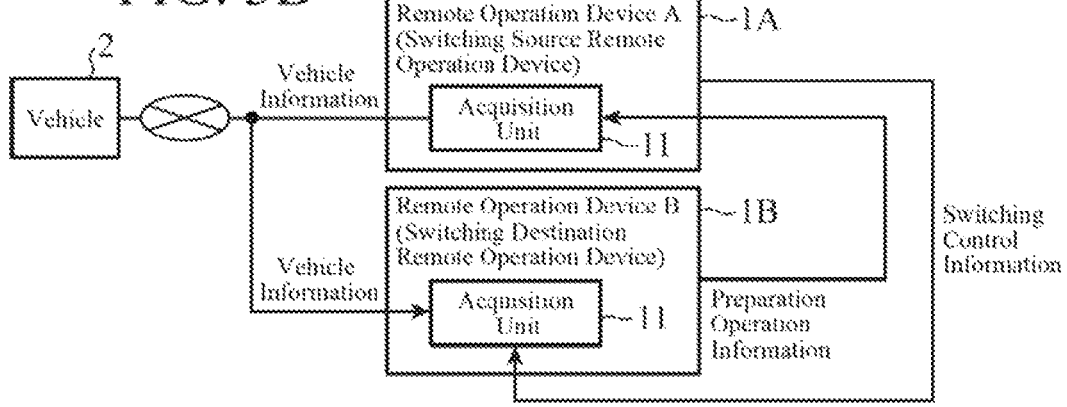
Figure 3C:
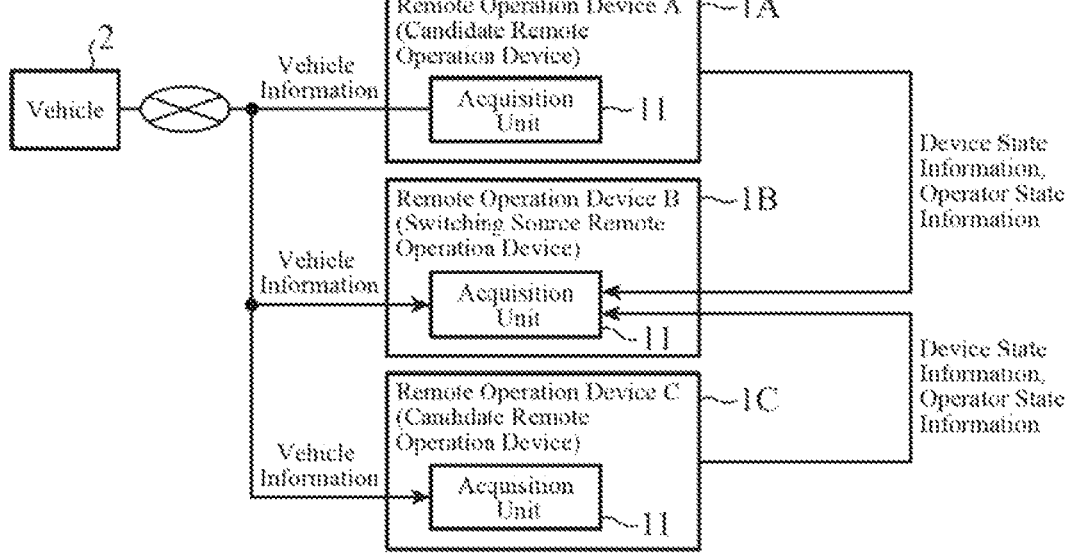

Here, FIG. 3 is a diagram for explaining information acquired by the acquisition unit of the remote operation device 1 in the remote operation system according to the first embodiment. In FIG. 3, as an example, the remote operation system includes three remote operation devices 1 of a remote operation device A (1A), a remote operation device B (1B), and a remote operation device C (1C). FIG. 3A illustrates a state before switching occurs, in which the remote operation device A (1A) is a switching source remote operation device, and the remote operation device B (1B) and the remote operation device C (1C) are candidate remote operation devices. FIG. 3B illustrates a state in which switching of the remote operation device 1 occurs from the state illustrated in FIG. 3A, and the remote operation device A (1A) as the switching source remote operation device determines the remote operation device B (1B) as the switching destination remote operation device. In FIG. 3B, illustration of the remote operation device C (1C) is omitted for convenience of explanation. FIG. 3C illustrates a state in which the switching of the remote operation device 1 is completed from the state illustrated in FIG. 3B, and the remote operation device B (1B) is performing the remote operation of the vehicle 2 as the switching source remote operation device.

In the state illustrated in FIG. 3A, each of the acquisition units 11 of the remote operation devices A (1A) to C (1C) acquires vehicle information from the vehicle 2. The acquisition unit 11 of the remote operation device A (1A) as the switching source remote operation device acquires the device state information and the operator state information from the remote operation devices B (1B) and C (1C) as the candidate remote operation devices.

In the state illustrated in FIG. 3B, each of the acquisition units 11 of the remote operation devices A (1A) and B (1B) acquires vehicle information from the vehicle 2. The acquisition unit 11 of the remote operation device B (1B) that is the switching destination remote operation device acquires the switching control information from the remote operation device A (1A) as the switching source remote operation device. Further, the acquisition unit 11 of the remote operation device A (1A) as the switching source remote operation device acquires the preparation operation information from the remote operation device B (1B) as the switching destination remote operation device. Note that, in the state illustrated in FIG. 3B, the acquisition unit 11 of the remote operation device A (1A) acquires the device state information and the operator state information from the remote operation devices B (1B) and C (1C) until the switching is completed, but the device state information and the operator state information are not illustrated in FIG. 3B for convenience of explanation.

In the state illustrated in FIG. 3C, each of the acquisition units 11 of the remote operation devices A (1A) to C (1C) acquires vehicle information from the vehicle 2. Further, the acquisition unit 11 of the remote operation device B (1B) as the switching source remote operation device acquires the device state information and the operator state information from the remote operation devices A (1A) and C (1C) as the candidate remote operation devices.

Although not illustrated in FIG. 3, operation information for remotely operating the vehicle 2 is transmitted from the switching source remote operation device that remotely operates the vehicle to the vehicle 2.

The acquisition unit 11 outputs the acquired various types of information to the delay time detecting unit 12, the switching control unit 13, and the operation control unit 14.

The delay time detecting unit 12 detects a communication delay time in communication between the remote operation device 1 and the vehicle 2. Note that the delay time detecting unit 12 functions both in a case where the remote operation device 1 is a switching source remote operation device and in a case where the remote operation device 1 is a candidate remote operation device.

The delay time detecting unit 12 detects the communication delay time on the basis of, for example, unidirectional information transmitted from the vehicle 2 to the remote operation device 1. Specifically, for example, the delay time detecting unit 12 acquires the time (hereinafter, referred to as "vehicle time") measured by the vehicle 2 from the vehicle 2, and sets the difference between the vehicle time and the time (hereinafter, referred to as "device time") when the vehicle time is acquired by the remote operation device 1 as the communication delay time. For example, the information on the vehicle time may be included in the information on the vehicle and acquired by the vehicle information acquiring unit 113. For example, the delay time detecting unit 12 sets the time when the vehicle information acquiring unit 113 acquires the vehicle time as the device time.

Note that, it is assumed that the remote operation device 1 and the vehicle 2 each include a clock capable of measuring a high-definition time such as a global positioning system (GPS) time.

The above-described method for detecting the communication delay time by the delay time detecting unit 12 is merely an example. The delay time detecting unit 12 only needs to be able to detect a communication delay time with which remote driving of the vehicle 2 cannot be normally performed in communication between the remote operation device 1 and the vehicle 2.

The delay time detecting unit 12 outputs information on the detected communication delay time to the switching control unit 13 and the detection unit 15.

In a case where the remote operation device 1 is the switching source remote operation device, the switching control unit 13 determines whether or not to switch the remote operation device 1 that performs the remote operation of the vehicle 2. When having determined to perform the switching, the switching control unit 13 determines a switching destination remote operation device from among the candidate remote operation devices, and outputs switching control information for remotely operating the vehicle 2 to the determined switching destination remote operation device.

Specifically, the delay time determining unit 131 of the switching control unit 13 determines whether or not the communication delay time detected by the delay time detecting unit 12 exceeds a preset threshold (hereinafter, referred to as a "delay time determination threshold").

When the communication delay time exceeds the delay time determination threshold, the delay time determining unit 131 determines to switch the remote operation device 1 that performs the remote operation of the vehicle 2, and outputs delay presence information indicating that the communication delay time exceeds the delay time determination threshold to the switching destination determining unit 132 of the switching control unit 13.

When the delay time determining unit 131 determines that the communication delay time exceeds the delay time determination threshold, the switching destination determining unit 132 determines the switching destination remote operation device from among the candidate remote operation devices on the basis of the information on the candidate remote operation devices acquired by the acquisition unit 11 depending on whether or not the switching determination condition is satisfied.

The switching determination condition is set in advance. Hereinafter, specific contents of the switching determination condition will be described with some examples.

Switching Determination Condition Example 1

For example, the switching determination condition is that the communication delay time between the candidate remote operation device and the vehicle 2 is equal to or less than a preset threshold (hereinafter, referred to as "non-prime device delay time determination threshold"). As the non-prime device delay time determination threshold, a value equal to or less than the delay time determination threshold is set in advance. The non-prime device delay time determination threshold may be the same value as the delay time determination threshold.

The switching destination determining unit 132 may determine the communication delay time between the candidate remote operation device and the vehicle 2 from the device state information acquired by the device information acquiring unit 111.

The switching destination determining unit 132 determines, as the switching destination remote operation device, a candidate remote operation device for which the communication delay time between the candidate remote operation device and the vehicle 2 is equal to or less than the non-prime device delay time determination threshold, among the candidate remote operation devices.

Switching Determination Condition Example 2

For example, the switching determination condition is that the state of a remote operator operating a candidate remote operation device is a state in which the remote operator can operate the candidate remote operation device, and the communication delay time between the candidate remote operation device and the vehicle 2 is equal to or less than the non-prime device delay time determination threshold.

The switching destination determining unit 132 may determine the state of the remote operator operating the candidate remote operation device from the operator state information acquired by the operator information acquiring unit 112. The state of the remote operator operating the candidate remote operation device being the state in which the remote operator can operate the candidate remote operation device refers to, for example, the following states (1) to (3).

(1) State in which remote operator is seated facing the candidate remote operation device
(2) State in which remote operator is qualified to perform remote operation of the vehicle 2
(3) Health state in which remote operator can remotely operate the vehicle 2 normally The health state in which the remote operator can remotely operate the vehicle 2 normally refers to, for example, a state in which the remote operator is not drunk, a state in which the wakefulness level of the remote operator is equal to or greater than a predetermined degree, or a state in which the proficiency level of the remote operator in the remote operation of the vehicle 2 is equal to or greater than a predetermined degree.

For example, the switching destination determining unit 132 determines, as the switching destination remote operation device, a candidate remote operation device for which the state of the remote operator operating the candidate remote operation device satisfies all of the above (1) to (3) and the communication delay time between the candidate remote operation device and the vehicle 2 is equal to or less than the non-prime device delay time determination threshold, among the candidate remote operation devices.

Note that, the above (1) to (3) are merely examples, and states other than the above (1) to (3) may be defined for states in which the remote operator can operate the candidate remote operation device. For the state in which the remote operator can operate the candidate remote operation device, a state of the remote operator as a state of the remote operator in which the vehicle 2 is remotely driven normally when the remote operator in the state operates the remote operation device 1 may be defined.

Figure 4:
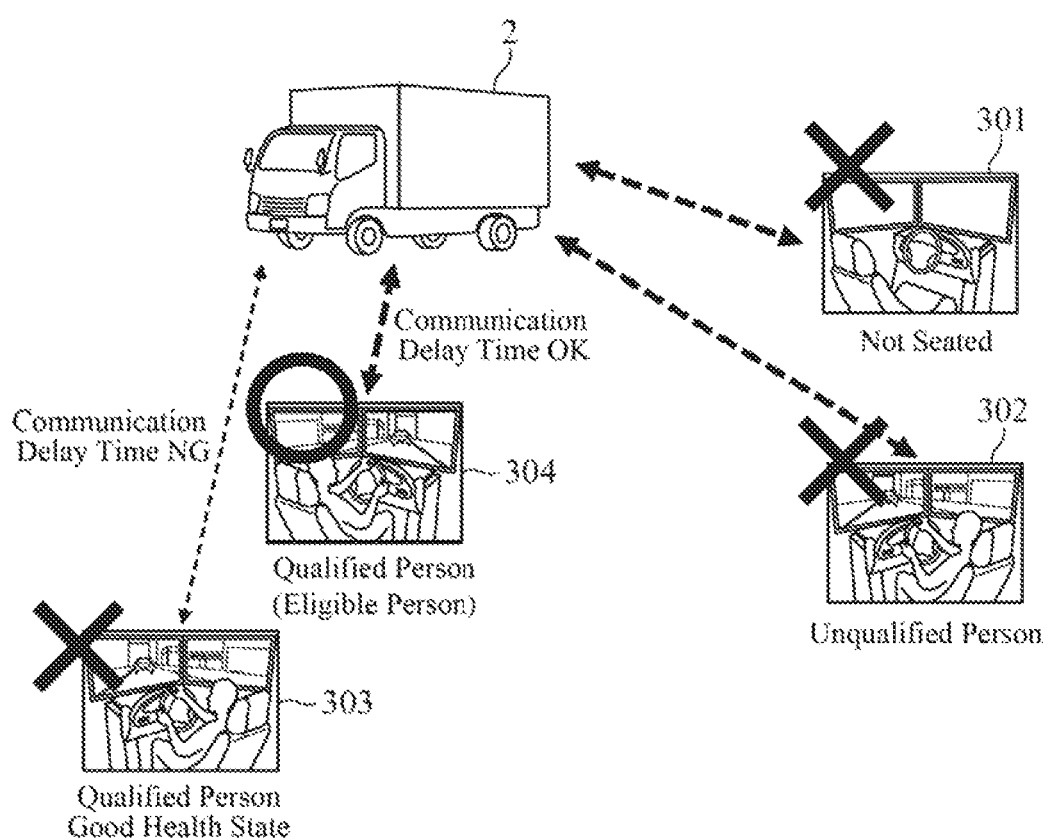
FIG. 4 is a diagram illustrating an example in which a switching destination determining unit determines a switching destination remote operation device depending on whether or not a switching determination condition is satisfied in the first embodiment.

FIG. 4 is a diagram illustrating an example in which the switching destination determining unit 132 determines the switching destination remote operation device depending on whether or not the switching determination condition is satisfied in the first embodiment. In FIG. 4, as an example, the switching determination condition is "Switching determination condition example 2" described above. In FIG. 4, it is assumed that there are four candidate remote operation devices, and the states of the four candidate remote operation devices and the states of the remote operators operating the four candidate remote operation devices are indicated by 301 to 304. The switching destination determining unit 132 determines the switching destination remote operation device from among the four candidate remote operation devices.

In FIG. 4, in the state illustrated in 301, the remote operator of the candidate remote operation device is not seated. That is, the remote operator of the candidate remote operation device does not satisfy the above (1).

In FIG. 4, in the state illustrated in 302, the remote operator is not qualified to perform the remote operation of the vehicle 2. That is, the remote operator of the candidate remote operation device does not satisfy the above (2).

In FIG. 4, in the state illustrated in 303, the remote operator of the candidate remote operation device is seated, is qualified to perform the remote operation of the vehicle 2, and has the good health state. That is, the remote operator of the candidate remote operation device satisfies all of the above (1) to (3). However, the communication delay time between the candidate remote operation device and the vehicle 2 exceeds the non-prime device delay time determination threshold.

Thus, when the state of the candidate remote operation device and the state of the remote operator operating the candidate remote operation device are the states indicated in 301 to 303, the switching destination determining unit 132 determines that "Switching determination condition example 2" is not satisfied for the candidate remote operation device.

On the other hand, in the state illustrated in 304 in FIG. 4, the candidate remote operation device satisfies all of the above (1) to (3), and the communication delay time between the candidate remote operation device and the vehicle 2 is equal to or less than the non-prime device delay time determination threshold. That is, the candidate remote operation device satisfies "Switching determination condition example 2" described above.

Therefore, the switching destination determining unit 132 determines the candidate remote operation device in the state indicated by 304 as the switching destination remote operation device.

When there are a plurality of candidate remote operation devices satisfying the switching determination condition, the switching destination determining unit 132 may determine one candidate remote operation device among the candidate remote operation devices satisfying the switching determination condition as the switching destination remote operation device in accordance with a determination condition as appropriate.

For example, it is assumed that the switching determination condition is "Switching determination condition example 1" described above, and there are a plurality of candidate remote operation devices each having a communication delay time with the vehicle 2 equal to or less than the non-prime device delay time determination threshold. In this case, for example, the switching destination determining unit 132 determines, as the switching destination remote operation device, a candidate remote operation device having the shortest communication delay time between the candidate remote operation device and the vehicle 2, among the candidate remote operation devices.

Further, for example, the switching destination determining unit 132 may determine, as the switching destination remote operation device, a candidate remote operation device present at a position on a route to the destination of the vehicle 2 and closest to the current location, among the candidate remote operation devices. Note that the switching destination determining unit 132 may acquire information on the route to the destination of the vehicle 2 and the current location from the vehicle information acquiring unit 113. The switching destination determining unit 132 may acquire information on the position where the candidate remote operation device is present from the device information acquiring unit 111. It is assumed that the device information acquiring unit 111 has acquired the position information of the candidate remote operation device as the device state information.

In addition, the switching destination determining unit 132 may determine, as the switching destination remote operation device, a candidate remote operation device having the longest duration of a state in which the communication delay time is equal to or less than the non-prime device delay time determination threshold. The switching destination determining unit 132 may acquire the information on the duration from the device information acquiring unit 111. It is assumed that the device information acquiring unit 111 acquires the information on the duration as the device state information.

Note that, when there is no candidate remote operation device satisfying the switching determination condition, the switching destination determining unit 132 does not determine the switching destination remote operation device. In this case, the switching source remote operation device generates operation information for stopping the vehicle 2, and outputs the generated operation information to the vehicle 2.

When having determined the switching destination remote operation device, the switching destination determining unit 132 outputs information on the determined switching destination remote operation device to the switching control unit 13.

When information on the switching destination remote operation device is output from the switching destination determining unit 132, the switching control unit 13 outputs switching preparation instruction information to the switching destination remote operation device. At this time, the switching control unit 13 adds vehicle information and information capable of specifying the switching source remote operation device to the switching preparation instruction information, and outputs the information to the switching destination remote operation device.

The switching destination remote operation device acquires switching preparation instruction information and generates preparation operation information. Specifically, in the switching destination remote operation device, the operation control unit 14 acquires the switching preparation instruction information and generates the preparation operation information. Details of the operation control unit 14 will be described later.

In the first embodiment, the operation information generated by the switching destination remote operation device upon receiving the switching preparation instruction information is referred to as "preparation operation information" as described above.

The difference calculating unit 133 of the switching control unit 13 calculates a difference between the operation information generated by the operation control unit 14 in the switching source remote operation device and the preparation operation information generated by the switching destination remote operation device. Note that, the preparation operation information acquiring unit 114 acquires the preparation operation information generated by the switching destination remote operation device from the switching destination remote operation device.

Here, the operation information and the preparation operation information will be described in more detail.

As described above, the operation information is information for remotely operating the vehicle 2. The operation information includes one or more types of information as information for remotely operating the vehicle 2. Specifically, for example, the operation information includes information on the speed of the vehicle 2, a control amount of the steering wheel angle, or a control amount of the accelerator opening.

The operation control unit 14 generates operation information. The operation control unit 14 generates operation information on the basis of, for example, vehicle information acquired by the vehicle information acquiring unit 113.

When the operation information generated by the operation control unit 14 is output to the vehicle 2, the vehicle 2 performs remote driving on the basis of the operation information.

The preparation operation information is operation information generated when the switching control information acquiring unit 115 acquires the switching preparation instruction information from the switching source remote operation device in the switching destination remote operation device among the operation information generated by the operation control unit 14. The preparation operation information is also information for remotely operating the vehicle 2, but the preparation operation information is not actually output to the vehicle 2. In a case where the preparation operation information is generated, the operation control unit 14 adds information indicating that the preparation operation information is generated to the preparation operation information.

In a case where the remote operation device 1 is the switching destination remote operation device, the operation control unit 14 generates the preparation operation information on the basis of the vehicle information added to the switching preparation instruction information.

The description returns to the difference calculating unit 133.

For example, it is assumed that the operation information and the preparation operation information include information on the steering wheel angle and information on the speed of the vehicle 2.

The difference calculating unit 133 calculates a difference between the information on the steering wheel angle included in the operation information and the information on the steering wheel angle included in the preparation operation information, and calculates a difference between the information on the speed of the vehicle 2 included in the operation information and the information on the speed of the vehicle 2 included in the preparation operation information.

The difference calculating unit 133 outputs information on the calculated difference between the operation information and the preparation operation information (hereinafter, referred to as "difference information") to the switching control unit 13. In the above example, the difference calculating unit 133 outputs, to the switching control unit 13, difference information between the information on the steering wheel angle included in the operation information and the information on the steering wheel angle included in the preparation operation information, and difference information between the information on the speed of the vehicle 2 included in the operation information and the information on the speed of the vehicle 2 included in the preparation operation information.

When the difference information is output from the difference calculating unit 133, the switching control unit 13 determines whether or not the difference between the operation information and the preparation operation information is within a preset threshold (hereinafter, referred to as a "difference determination threshold"). In the difference determination threshold, a value allowed as a difference between the operation information and the preparation operation information is set. Specifically, for example, in a case where there is a passenger in the vehicle 2, a value of a difference between the operation information and the preparation operation information in such a degree that even when the state in which the vehicle 2 is remotely operated on the basis of the operation information is switched to the state in which the vehicle 2 is remotely operated on the basis of the preparation operation information, the passenger can continue boarding without feeling strange is set to the difference determination threshold.

Note that the difference determination threshold is set for each type of information included in the operation information or the preparation operation information. In the above example, the difference determination threshold is set for each of the information on the steering wheel angle and the information on the speed of the vehicle 2.

When determining that the difference between the operation information and the preparation operation information is within the difference determination threshold, the switching control unit 13 determines whether or not a state in which the difference between the operation information and the preparation operation information is within the difference determination threshold has continued for a preset time (hereinafter, referred to as "difference continuation determination time"). Note that, when the difference information is output from the difference calculating unit 133, the switching control unit 13 stores the difference information in a storage unit (not illustrated) in association with the output date and time of the difference information. The switching control unit 13 may refer to the storage unit to determine whether or not a state in which the difference between the operation information and the preparation operation information is within the difference determination threshold has continued for the difference continuation determination time.

When the state in which the difference between the operation information and the preparation operation information is within the difference determination threshold has continued for the difference continuation determination time, in the switching source remote operation device, the switching control unit 13 determines that the preparation operation information generated in the switching destination remote operation device can be used as the operation information for actually performing the remote operation of the vehicle 2. In other words, the switching control unit 13 determines that the switching timing at which the remote operation device 1 performing remote operation of the vehicle 2 may be switched from the switching source remote operation device to the switching destination remote operation device has come.

In the switching source remote operation device, when determining that the switching timing has come, the switching control unit 13 outputs switching instruction information to the switching destination remote operation device, and causes the operation control unit 14 of the switching source remote operation device not to generate operation information. Note that, the switching control unit 13 outputs the switching instruction information to the switching destination remote operation device via the output unit 16 of the switching source remote operation device. The switching control unit 13 adds vehicle information to the switching instruction information.

In the switching destination remote operation device that has acquired the switching instruction information output by the switching source remote operation device, the vehicle information is acquired from the vehicle 2, and the operation control unit 14 generates the operation information on the basis of the vehicle information. Thereafter, the switching destination remote operation device is switched to the switching source remote operation device, and the generated operation information is output to the vehicle 2 to perform the remote operation of the vehicle 2. Thus, the remote operation device 1 is switched.

Figure 5:
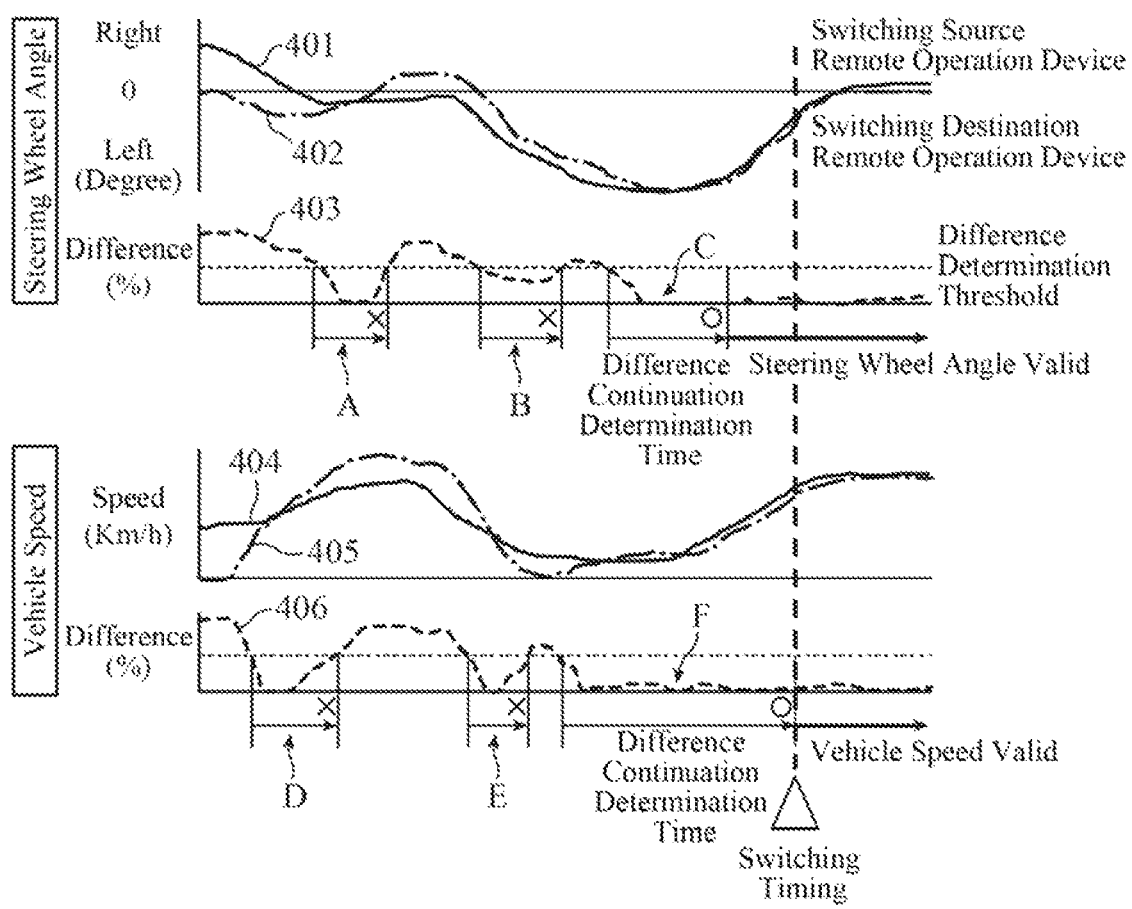
FIG. 5 is a diagram for explaining an example of a flow until a switching control unit determines that a switching timing has come on the basis of difference information output from a difference calculating unit in the first embodiment.

FIG. 5 is a diagram for explaining an example of a flow until the switching control unit 13 determines that the switching timing has come on the basis of the difference information output from the difference calculating unit 133 in the first embodiment.

In the example illustrated in FIG. 5, similarly to the above-described example, it is assumed that the operation information and the preparation operation information include information on the control amount of the steering wheel angle and the speed of the vehicle 2.

In FIG. 5, reference numerals 401 and 404 denote temporal transitions of operation information generated by the switching source remote operation device and currently used for remote operation of the vehicle 2. Specifically, reference numeral 401 denotes a temporal transition of the control amount of the steering wheel angle, and reference numeral 404 denotes a temporal transition of the information on the speed of the vehicle 2.

In FIG. 5, reference numerals 402 and 405 denote temporal transitions of the preparation operation information generated by the switching destination remote operation device and not used for the remote operation of the vehicle 2. Specifically, reference numeral 402 denotes a temporal transition of the control amount of the steering wheel angle, and reference numeral 405 denotes a temporal transition of the information on the speed of the vehicle 2.

In FIG. 5, reference numeral 403 denotes difference information between the control amount of the steering wheel angle indicated by reference numeral 401 and the control amount of the steering wheel angle indicated by reference numeral 402, which are output by the difference calculating unit 133. Reference numeral 406 represents difference information between the information on the speed of the vehicle 2 indicated by 403 and the information on the speed of the vehicle 2 indicated by 404, which are output by the difference calculating unit 133.

In FIG. 5, the time indicated by A and B and the difference in the control amount of the steering wheel angle are within the difference determination threshold, but the state in which the difference in the control amount of the steering wheel angle is within the difference determination threshold does not continue for the difference continuation determination time.

In addition, the time indicated by D and E and the difference in the speed of the vehicle 2 are within the difference determination threshold, but a state in which the difference in the speed of the vehicle 2 is within the difference determination threshold does not continue for the difference continuation determination time.

In the time indicated by C, the difference in the control amount of the steering wheel angle becomes the difference determination threshold, and a state in which the difference in the control amount of the steering wheel angle is within the difference determination threshold continues for the difference continuation determination time. However, at the time point when the time indicated by C has elapsed, the state in which the difference in the speed of the vehicle 2 is within the difference determination threshold has not yet continued for the difference continuation determination time. Therefore, the switching control unit 13 does not determine that the switching timing has come at the time point when the time indicated by C has elapsed.

At the time point when the time indicated by F has elapsed, both the difference in the control amount of the steering wheel angle and the difference in the speed of the vehicle 2 are within the difference determination threshold and the difference continuation determination time continues. When the time indicated by F has elapsed, the switching control unit 13 determines that the switching timing has come.

Return to the explanation of FIG. 2.

The operation control unit 14 generates the above-described operation information or the above-described preparation operation information.

In a case where the remote operation device 1 is the switching source remote operation device, the operation control unit 14 generates operation information. In a case where the remote operation device 1 is the switching destination remote operation device, the operation control unit 14 generates preparation operation information.

The operation control unit 14 outputs the generated operation information to the vehicle 2 via the output unit 16. However, when the generated operation information is the preparation operation information, the operation control unit 14 outputs the preparation operation information to the switching source remote operation device via the output unit 16.

As described above, when the remote operation device 1 is determined as the switching destination remote operation device, the preparation operation information is generated by the switching destination remote operation device and is not output to the vehicle 2 until the switching instruction information is output from the switching source remote operation device. Since the preparation operation information is not output to the vehicle 2, the vehicle 2 is not actually remotely operated by the preparation operation information.

When the remote operation device 1 is a candidate remote operation device, the detection unit 15 detects information on the remote operation device 1. The information on the remote operation device 1 is, for example, device state information or operator state information.

The device information detecting unit 151 of the detection unit 15 detects device state information.

As described above, the device state information includes, for example, information on whether or not the remote operation device 1 is operated by the remote operator, information on whether or not the remote operation device 1 is in the standby state, or information on the communication delay time. When the remote operation device 1 is a candidate remote operation device, the device information detecting unit 151 may detect whether or not the candidate remote operation device is being operated by the remote operator, for example, by acquiring information on the steering wheel angle from a steering wheel angle sensor (not illustrated). For example, the device information detecting unit 151 may detect that the candidate remote operation device is in the standby state by detecting that the candidate remote operation device and the vehicle 2 are connected by communication. In addition, the device information detecting unit 151 may acquire the communication delay time from the delay time detecting unit 12, for example.

Note that the above-described method for detecting the device state information is merely an example. The device information detecting unit 151 detects the device state information by an appropriate method.

The device information detecting unit 151 outputs the device state information to the switching source remote operation device via the output unit 16.

The device information detecting unit 151 may detect the device state information at a preset cycle, for example, or may detect the device state information when the device state information is requested from the switching source remote operation device. The device information detecting unit 151 may output the device state information to the switching source remote operation device only when there is a change in the device state information.

The switching source remote operation device acquires the device state information output from the device information detecting unit 151 of the candidate remote operation device. Specifically, in the switching source remote operation device, the device information acquiring unit 111 acquires the device state information output by the device information detecting unit 151.

The operator information detecting unit 152 of the detection unit 15 detects the operator state information.

As described above, the operator state information specifically includes, for example, information on whether or not the remote operator operating the remote operation device 1 is seated facing the remote operation device 1, information on whether or not the remote operator operating the remote operation device 1 is qualified to perform remote operation of the vehicle 2, or information on the health state of the remote operator operating the remote operation device 1.

When the remote operation device 1 is a candidate remote operation device, the operator information detecting unit 152 may detect, for example, whether or not the remote operator is seated facing the candidate remote operation device by detecting that the OK button has been pressed. For example, the operator information detecting unit 152 may acquire a captured image obtained by imaging the remote operator by an imaging device (not illustrated), and may detect whether or not the remote operator is qualified to perform the remote operation of the vehicle 2 by matching information on the remote operator extracted from the acquired captured image with operator information registered in advance in an authentication server (not illustrated). The operator information detecting unit 152 may extract information on the remote operator from the captured image using a known image recognition technique.

For example, the operator information detecting unit 152 may detect the health state of the operator from the captured image using a known image recognition technique. The operator information detecting unit 152 may determine the wakefulness level or the proficiency level of the remote operator using a known technique (See, for example, JP 2018-077649 A), and detect the determined wakefulness level or proficiency level as the health state of the remote operator. In addition, the operator information detecting unit 152 may detect whether or not the remote operator is in a drunk state using, for example, a known technique.

Note that the above-described method for detecting the operator state information is merely an example. The operator information detecting unit 152 detects the operator state information by an appropriate method.

The operator information detecting unit 152 outputs the operator state information to the switching source remote operation device via the output unit 16.

For example, the operator information detecting unit 152 may detect the remote operator state information at a preset cycle, or may detect the operator state information when the operator state information is requested from the switching source remote operation device. In addition, the operator information detecting unit 152 may output the operator state information to the switching source remote operation device only when there is a change in the operator state information.

The switching source remote operation device acquires the operator state information output from the operator information detecting unit 152 of the candidate remote operation device. Specifically, in the switching source remote operation device, the operator information acquiring unit 112 acquires the operator state information output by the operator information detecting unit 152.

The output unit 16 outputs various types of information.

When the remote operation device 1 is a candidate remote operation device, the device information output unit 161 of the output unit 16 outputs the device state information output by the device information detecting unit 151 to the switching source remote operation device.

When the remote operation device 1 is a candidate remote operation device, the operator information output unit 162 of the output unit 16 outputs the operator state information output by the operator information detecting unit 152 to the switching source remote operation device.

When the remote operation device 1 is a candidate remote operation device, the preparation operation information output unit 165 of the output unit 16 outputs the preparation operation information generated by the operation control unit 14 to the switching source remote operation device. Since the preparation operation information is added with information indicating the preparation operation information, the preparation operation information output unit 165 can specify from the information that the operation information output from the operation control unit 14 is the preparation operation information.

In a case where the remote operation device 1 is the switching source remote operation device, the switching control information output unit 163 of the output unit 16 outputs the switching preparation instruction information or the switching instruction information output from the switching control unit 13 to the switching destination remote operation device.

In a case where the remote operation device 1 is the switching source remote operation device, the operation information output unit 164 of the output unit 16 outputs the operation information generated by the operation control unit 14 to the vehicle 2.

The operation of the remote operation device 1 according to the first embodiment will be described.

In the following operation explanation, an operation in a case where the remote operation device 1 is the switching source remote operation device, and an operation in a case where the remote operation device 1 is a remote operation device 1 other than the switching source remote operation device will each be described with reference to flowcharts.

Figure 6:
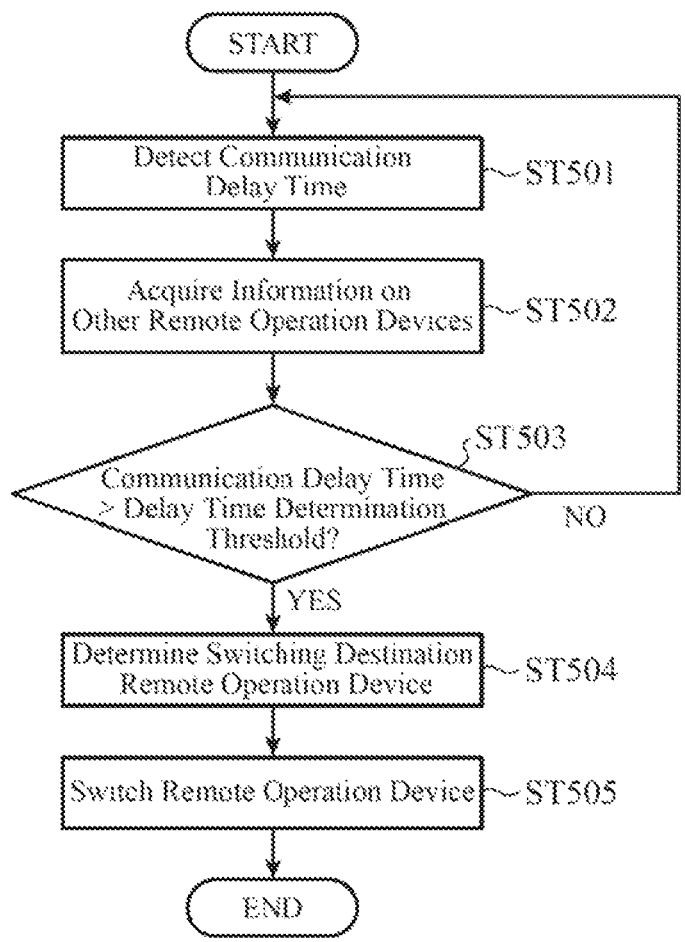
FIG. 6 is a flowchart for explaining an operation of the remote operation device according to the first embodiment that operates as a switching source remote operation device.

FIG. 6 is a flowchart for explaining the operation of the remote operation device 1 according to the first embodiment that operates as the switching source remote operation device.

The delay time detecting unit 12 detects a communication delay time in communication between the switching source remote operation device and the vehicle 2 (step ST501).

The delay time detecting unit 12 outputs information on the detected communication delay time to the switching control unit 13 and the detection unit 15.

The acquisition unit 11 acquires various types of information.

Specifically, for example, the device information acquiring unit 111 of the acquisition unit 11 acquires the device state information from the candidate remote operation device, and the operator information acquiring unit 112 of the acquisition unit 11 acquires the operator state information from the candidate remote operation device (step ST502).

The acquisition unit 11 outputs the acquired various types of information to the delay time detecting unit 12, the switching control unit 13, and the operation control unit 14.

Note that, here, the operation of the remote operation device 1 is performed in the order of step ST501 and step ST502, but it is not limited thereto, and the operation of the remote operation device 1 may be performed in the order of step ST502 and step ST501.

The delay time determining unit 131 of the switching control unit 13 determines whether or not the communication delay time detected by the delay time detecting unit 12 in step ST501 exceeds a delay time determination threshold (step ST503).

If the delay time determining unit 131 determines in step ST503 that the communication delay time does not exceed the delay time determination threshold (in case of "NO" in step ST503), the operation of the remote operation device 1 returns to step ST501 and proceeds to operations in step ST501 onward.

When it is determined in step ST503 that the communication delay time exceeds the delay time determination threshold (in case of "YES" in step ST503), the delay time determining unit 131 determines to switch the remote operation device 1 that remotely operates the vehicle 2, and outputs delay presence information indicating that the communication delay time exceeds the delay time determination threshold to the switching destination determining unit 132 of the switching control unit 13.

The switching destination determining unit 132 determines a switching destination remote operation device from among the candidate remote operation devices depending on whether or not the switching determination condition is satisfied on the basis of the information on the candidate remote operation devices acquired by the acquisition unit 11 in step ST502 (step ST504).

When having determined the switching destination remote operation device, the switching destination determining unit 132 outputs information on the determined switching destination remote operation device to the switching control unit 13.

If there is no candidate remote operation device that satisfies the switching determination condition and the switching destination determining unit 132 has not been able to determine the switching destination remote operation device in step ST504, the operation control unit 14 generates operation information for stopping the vehicle 2 and outputs the generated operation information to the vehicle 2 via the output unit 16. Then, the remote operation device 1 ends the operation illustrated in the flowchart of FIG. 6.

The switching control unit 13 switches the remote operation device 1 that performs remote operation of the vehicle 2 to the switching destination remote operation device determined by the switching destination determining unit 132 in step ST504 (step ST505). Specifically, the switching control unit 13 outputs switching instruction information for remotely operating the vehicle 2 to the switching destination remote operation device.

Figure 7:
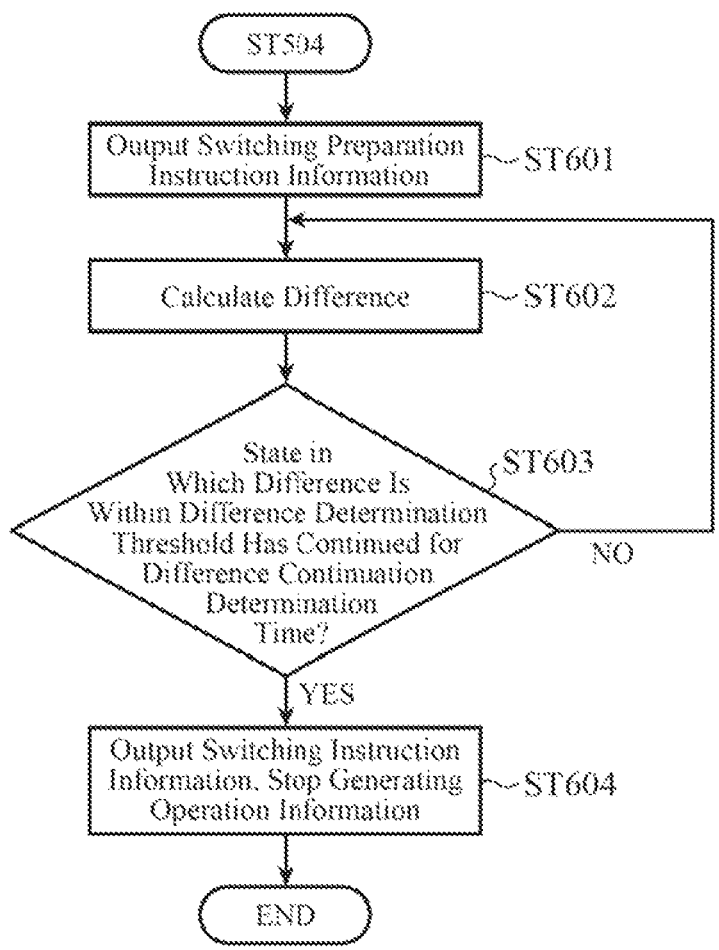
FIG. 7 is a flowchart for explaining a detailed operation in step ST505 in FIG. 6 in the first embodiment.

Here, FIG. 7 is a flowchart for explaining a detailed operation in step ST505 of FIG. 6 in the first embodiment.

When the information on the switching destination remote operation device is output from the switching destination determining unit 132 in step ST504 of FIG. 6, the switching control unit 13 outputs switching preparation instruction information to the switching destination remote operation device (step ST601).

The difference calculating unit 133 of the switching control unit 13 calculates a difference between the operation information generated by the operation control unit 14 of the switching source remote operation device and the preparation operation information generated by the switching destination remote operation device (see step ST804 in FIG. 9 to be described later) (step ST602).

The difference calculating unit 133 outputs the difference information to the switching control unit 13.

When the difference information is output from the difference calculating unit 133 in step ST602, the switching control unit 13 determines whether or not a state in which the difference between the operation information and the preparation operation information is within the difference determination threshold has continued for the difference continuation determination time (step ST603).

When the switching control unit 13 determines in step ST603 that the state in which the difference between the operation information and the preparation operation information is within the difference determination threshold has not continued for the difference continuation determination time (in case of "NO" in step ST603), the operation of the remote operation device 1 returns to step ST602 and the operations in and after step ST602 are performed.

When it is determined in step ST603 that the state in which the difference between the operation information and the preparation operation information is within the difference determination threshold has continued for the difference continuation determination time (in case of "YES" in step ST603), the switching control unit 13 determines that the switching timing at which the remote operation of the vehicle 2 may be switched to the switching destination remote operation device determined by the switching destination determining unit 132 in step ST504 of FIG. 6 has come.

When having determined that the switching timing has come, the switching control unit 13 outputs switching instruction information to the switching destination remote operation device, and causes the operation control unit 14 of the switching source remote operation device not to generate operation information (step ST604).

In this manner, the remote operation device 1 that performs remote operation of the vehicle 2 is switched.

FIG. 8 is a diagram for explaining an example of switching when the remote operation device 1 that performs remote operation of the vehicle 2 is switched as described in the flowchart of FIG. 7 in the first embodiment.

When it is determined in the switching source remote operation device that the difference between the operation information and the preparation operation information exceeds the difference determination threshold, the vehicle 2 is continuously remotely operated on the basis of the operation information output from the switching source remote operation device (see 701 in FIG. 8).

Thereafter, even when it is determined in the switching source remote operation device that the difference between the operation information and the preparation operation information is within the difference determination threshold, if it is determined that the state in which the difference is within the difference determination threshold has not continued for the difference continuation determination time, the vehicle 2 is continuously remotely operated on the basis of the operation information output from the switching source remote operation device (see 702 in FIG. 8).

When it is determined in the switching source remote operation device that the state in which the difference between the operation information and the preparation operation information is within the difference determination threshold has continued for the difference continuation determination time, the vehicle 2 is remotely operated on the basis of the operation information output from the switching destination remote operation device (see 703 in FIG. 8).

Figure 9:
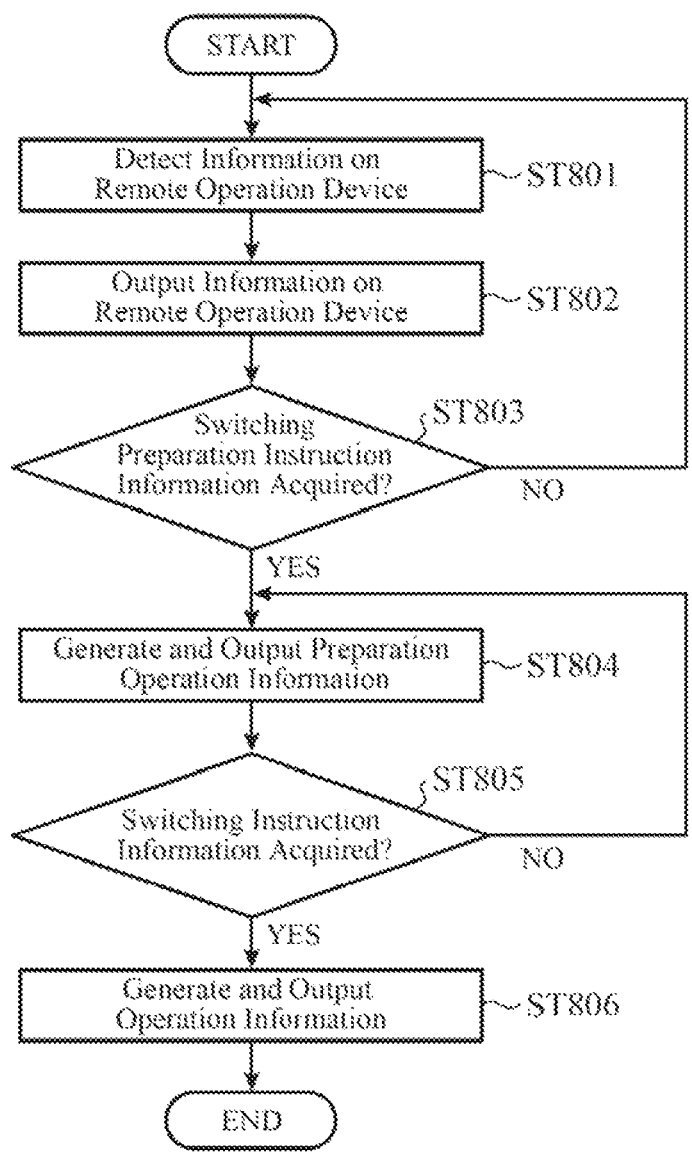
FIG. 9 is a flowchart for explaining an operation of the remote operation device according to the first embodiment operating as a candidate remote operation device.

FIG. 9 is a flowchart for explaining an operation of the remote operation device 1 according to the first embodiment operating as a candidate remote operation device.

The detection unit 15 detects information on the remote operation device 1, in other words, the candidate remote operation device. Specifically, the device information detecting unit 151 detects device state information. The operator information detecting unit 152 detects operator state information (step ST801).

The output unit 16 outputs the information on the candidate remote operation device detected by the detection unit 15 in step ST801 to the switching source remote operation device (step ST802).

The switching control information acquiring unit 115 determines whether or not switching preparation instruction information (see step ST601 in FIG. 7) output from the switching source remote operation device has been acquired from the switching source remote operation device (step ST803).

In step ST803, when the switching control information acquiring unit 115 has not acquired the switching preparation instruction information (in case of "NO" in step ST803), the operation of the remote operation device 1 returns to step ST801, and the operations in and after step ST801 are performed.

In step ST803, when the switching control information acquiring unit 115 has acquired the switching preparation instruction information (in case of "YES" in step ST803), the operation control unit 14 generates preparation operation information. Then, the operation control unit 14 outputs the generated preparation operation information to the switching source remote operation device via the output unit 16 (step ST804).

The switching control information acquiring unit 115 determines whether or not switching instruction information (see step ST601 in FIG. 7) output from the switching source remote operation device has been acquired from the switching source remote operation device (step ST805).

In step ST805, if the switching control information acquiring unit 115 has not acquired the switching instruction information (in case of "NO" in step ST805), the operation of the remote operation device 1 returns to step ST804, and the operations in and after step ST804 are performed.

In step ST805, when the switching control information acquiring unit 115 has acquired the switching instruction information (in case of "YES" in step ST805), the operation control unit 14 generates operation information. The operation control unit 14 outputs the generated operation information to the vehicle 2 via the output unit 16 (step ST806).

When the operation information is output in step ST806, the remote operation device 1 operates as the remote operation device 1 that performs remote operation of the vehicle 2 (see FIGS. 6 and 7).

Figure 10:
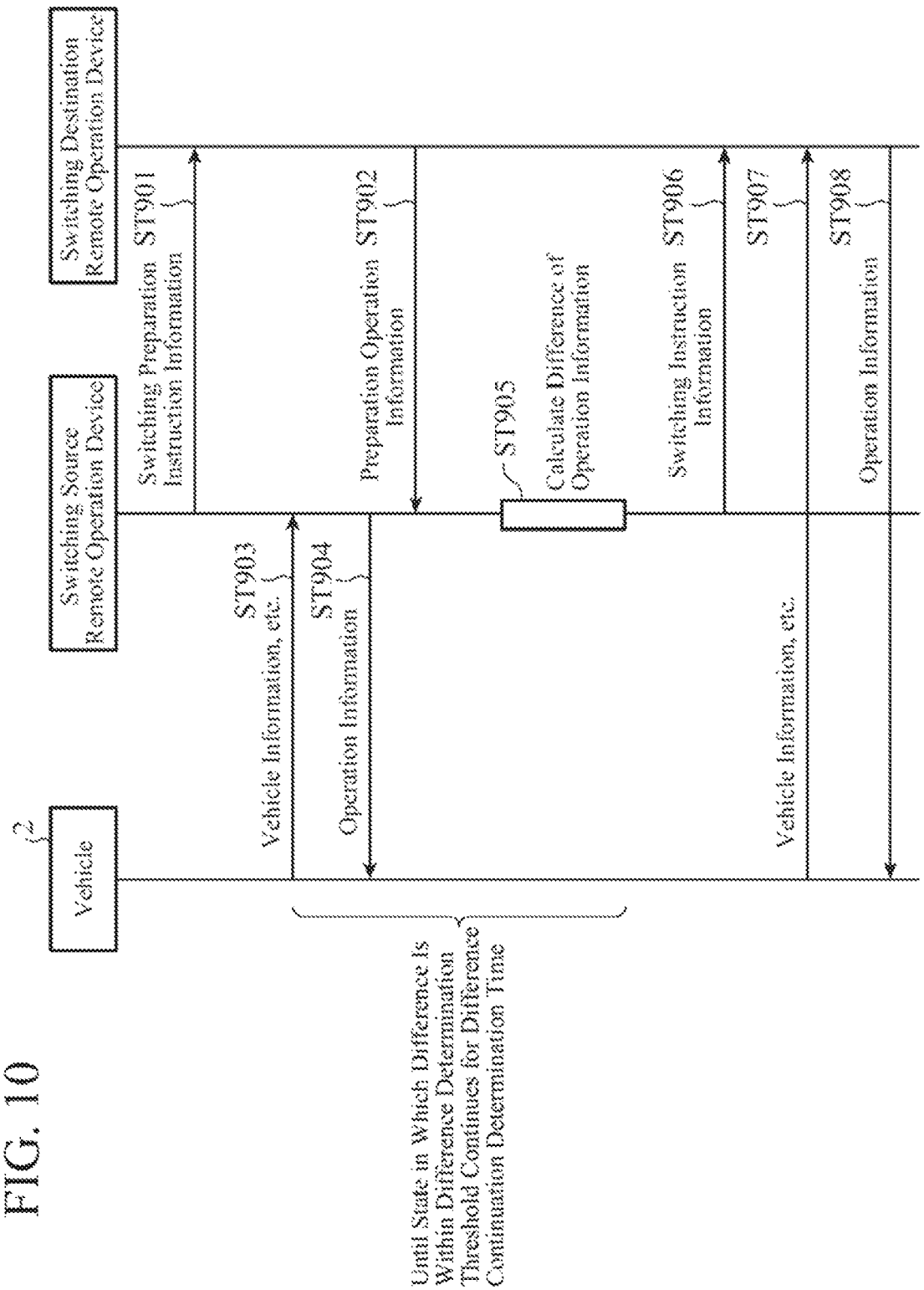
FIG. 10 is a sequence diagram illustrating an example of an operation from when a switching source remote operation device determines a switching destination remote operation device to when the switching destination remote operation device is switched to a remote operation device that remotely operates a vehicle in the first embodiment.

FIG. 10 is a sequence diagram illustrating an example of an operation after the switching source remote operation device determines the switching destination remote operation device until the switching destination remote operation device is switched to the remote operation device 1 that remotely operates the vehicle 2 in the first embodiment.

FIG. 10 illustrates the operation of the switching source remote operation device described with reference to the flowchart of FIG. 7 and the operation of the switching destination remote operation device described in steps ST803 to ST806 of FIG. 9.

When the switching source remote operation device determines the switching destination remote operation device, the switching source remote operation device outputs switching preparation instruction information to the switching destination remote operation device (step ST901).

The switching destination remote operation device generates the preparation operation information on the basis of the vehicle information added to the switching preparation instruction information. The switching destination remote operation device outputs the generated preparation operation information to the switching source remote operation device (step ST902).

The preparation operation information is not output to the vehicle 2. The vehicle 2 is remotely operated by the operation information generated by the switching source remote operation device on the basis of the vehicle information acquired from the vehicle 2 (steps ST903 to ST904).

The switching source remote operation device calculates a difference between the operation information and the preparation operation information acquired from the switching destination remote operation device (step ST905). Then, the switching source remote operation device determines whether or not a state in which the calculated difference is within the difference determination threshold has continued for the difference continuation determination time.

In the switching source remote operation device, steps ST902 to ST905 are repeated until a state in which the difference calculated in step ST905 is within the difference determination threshold continues for the difference continuation determination time.

When having determined that the state in which the difference calculated in step ST905 is within the difference determination threshold has continued for the difference continuation determination time, the switching source remote operation device outputs switching instruction information to the switching destination remote operation device (step ST906). At this time, the switching source remote operation device stops generating the operation information. That is, the operation information is not output from the switching source remote operation device to the vehicle 2.

Upon acquiring the switching instruction information output in step ST906, the switching destination remote operation device generates operation information on the basis of the vehicle information acquired from the vehicle 2. The switching destination remote operation device outputs the generated operation information to the vehicle 2 (steps ST907 to ST908). At this time, the switching destination remote operation device stops generating the preparation operation information.

Thereafter, the switching destination remote operation device becomes the remote operation device 1 that performs the remote operation of the vehicle 2. In this manner, the remote operation device 1 that remotely operates the vehicle 2 is switched.

As described above, when the communication delay time in the communication with the vehicle 2 exceeds the delay determination threshold during the remote operation of the vehicle 2, the remote operation device 1 according to the first embodiment determines to switch the remote operation device 1 that remotely operates the vehicle 2. Then, the remote operation device 1 determines the switching destination remote operation device from among the candidate remote operation devices depending on whether or not the switching determination condition is satisfied on the basis of the information on the candidate remote operation devices. The remote operation device 1 switches the remote operation device 1 that remotely operates the vehicle 2 by outputting switching instruction information to the determined switching destination remote operation device.

Specifically, when having determined the switching destination remote operation device, the remote operation device 1, in other words, the switching source remote operation device first outputs switching preparation instruction information to the switching destination remote operation device. The switching source remote operation device acquires the preparation operation information generated corresponding to the switching preparation instruction information from the switching destination remote operation device, and outputs the preparation operation information to the vehicle 2 to calculate a difference between the preparation operation information and the operation information for performing the remote operation of the vehicle 2. Then, when the state in which the difference between the operation information and the preparation operation information is within the difference determination threshold has continued for the difference continuation determination time, the switching source remote operation device outputs the switching instruction information to the switching destination remote operation device, and the switching source remote operation device does not generate the operation information.

The switching destination remote operation device having acquired the switching instruction information generates operation information and outputs the operation information to the vehicle 2. The switching destination remote operation device is switched to the remote operation device 1 that remotely operates the vehicle 2.

As described above, since the remote operation device 1 according to the first embodiment has determined to switch the remote operation device 1 when the communication delay time in the communication with the vehicle 2 exceeds the delay determination threshold during the remote operation of the vehicle 2, it is possible to prevent that the state in which the remote driving is normally performed cannot be maintained due to an increase in the communication delay present in the communication for performing the remote operation of the vehicle 2.

Figure 11:
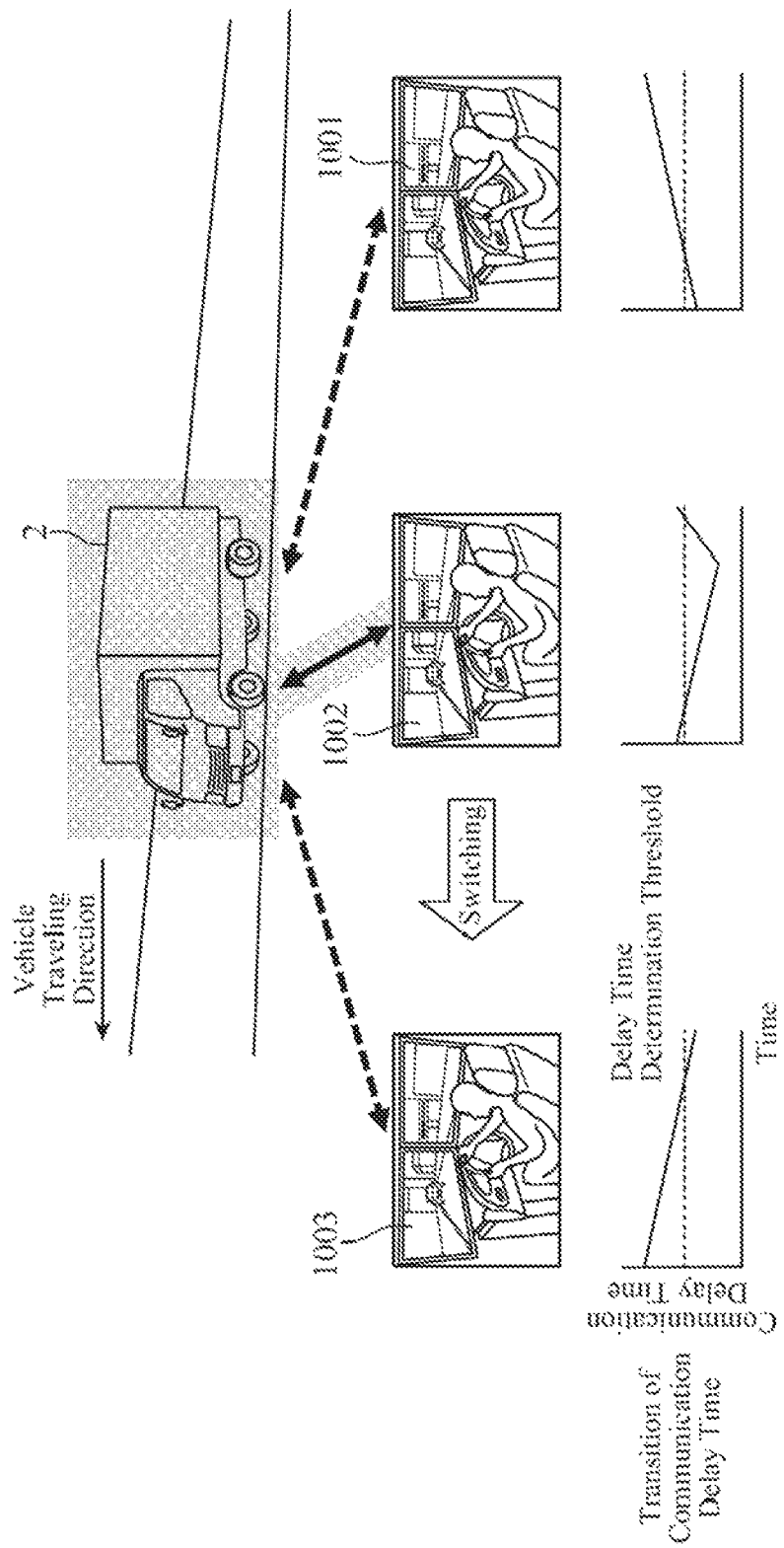
FIG. 11 is a diagram illustrating an example in which a remote operation device switches a remote operation device that remotely operates a vehicle on the basis of a communication delay time in communication with the vehicle in the first embodiment.

Here, FIG. 11 is a diagram illustrating an example in which the remote operation device 1 switches the remote operation device 1 that remotely operates the vehicle 2 on the basis of the communication delay time in the communication with the vehicle 2 in the first embodiment.

In FIG. 11, a remote operation device 1 (1001), a remote operation device 1 (1002), and a remote operation device 1 (1003) are installed on a route on which the vehicle 2 travels.

First, it is assumed that the remote operation device 1 (1002) installed at the location closest to the current position of the vehicle 2 is determined as the remote operation device 1 that remotely operates the vehicle 2.

Thereafter, when the vehicle 2 moves, the distance between the vehicle 2 and the remote operation device 1 (1002) increases. Then, the communication delay time in the communication between the vehicle 2 and the remote operation device 1 (1002) also increases, and eventually, the communication delay time exceeds the delay time determination threshold.

When the communication delay time in the communication between the vehicle 2 and the remote operation device 1 (1002) exceeds the delay time determination threshold, the remote operation device 1 (1002) determines to switch the remote operation device 1. Then, the remote operation device 1 (1002) determines, as the switching destination remote operation device, the remote operation device 1 (1003) whose communication delay time with the vehicle 2 is shorter than that of the remote operation device 1 (1002).

When acquiring the switching instruction information from the remote operation device 1 (1002), the remote operation device 1 (1003) determined as the switching destination remote operation device remotely operates the vehicle 2.

In a case where the remote operation device 1 according to the first embodiment is the switching source remote operation device and determines the switching destination remote operation device as described above, the remote operation device 1 first causes the switching destination remote operation device to generate preparation operation information. The switching source remote operation device acquires the preparation operation information from the switching destination remote operation device, and switches the remote operation device 1 so as to operate the switching destination remote operation device as the remote operation device 1 that remotely operates the vehicle 2 only after a state in which the difference between the operation information and the preparation operation information is within the difference determination threshold continues for the difference continuation determination time.

When the remote operation device 1 is actually switched and the operation information is output to the vehicle 2 from the remote operation device 1 that has become the switching source remote operation device after the switching, the remote operation device 1 is already operated by the remote operator. That is, the remote operation device 1 does not need to stop the vehicle 2 before the remote operator after switching operates the remote operation device 1 that has become the switching source remote operation device after switching. As a result, the operation efficiency of the vehicle 2 can be improved. Specifically, for example, in a case where the vehicle 2 is a taxi, a bus, a truck, or the like, the remote operation device 1 does not need to stop the vehicle 2, so that the operation rate of the vehicle 2 itself can be increased. In addition, the remote operation device 1 does not need to stop the vehicle 2, for example, so that the vehicle 2 can arrive at the destination quickly.

In addition, in general, when the vehicle 2 stops or starts, it is estimated that the possibility of occurrence of an abnormal event increases. In a case where the remote operation device 1 is the switching source remote operation device, the remote operation device 1 does not need to stop the vehicle 2 when switching the remote operation device 1 that remotely operates the vehicle 2, so that it is possible to reduce the possibility of occurrence of an abnormal event at the time of the switching.

In addition, even if the remote operation device 1 that remotely operates the vehicle 2 changes, in other words, even if the remote operator who operates the remote operation device 1 that remotely operates the vehicle 2 changes, the remote operation device 1 can reduce a sudden large change in the control amount of the vehicle 2.

In the first embodiment described above, the remote operation device 1 and the vehicle 2 can be connected only by wireless communication, for example. Furthermore, for example, the remote operation device 1 and the vehicle 2 may be connected by communication including wired communication and wireless communication, such as a mobile communication network, a public network such as the Internet, or a dedicated line. The remote operation device 1 and the vehicle 2 are connected by communication including wireless communication or wired communication, and the remote operation device 1 remotely operates the vehicle 2 by communication.

The communication delay in communication between the remote operation device 1 and the vehicle 2 includes not only a communication delay in wireless communication between the remote operation device 1 and the vehicle 2 but also a communication delay in wired communication between the remote operation device 1 and the vehicle 2. By determining to switch the remote operation device 1 when the communication delay time in the communication with the vehicle 2 exceeds the delay determination threshold during the remote operation of the vehicle 2, the remote operation device 1 can prevent that the communication delay present in the communication for performing the remote operation of the vehicle 2 is increased to such an extent that the state in which the remote driving is normally performed cannot be maintained, and thus the state in which the remote driving is normally performed cannot be maintained.

In the first embodiment described above, the remote operation device 1 includes the difference calculating unit 133. However, the remote operation device 1 does not necessarily include the difference calculating unit 133.

In a case where the remote operation device 1 does not include the difference calculating unit 133, when the switching destination determining unit 132 determines the switching destination remote operation device, the remote operation device 1 outputs switching instruction information to the switching destination remote operation device.

In this case, the remote operation device 1 can be configured not to include the preparation operation information acquiring unit 114 and the preparation operation information output unit 165.

In the first embodiment described above, the target of the remote operation device 1 to perform the remote operation is the vehicle 2, but this is merely an example. The remote operation device 1 in the embodiments described above can be used for any mobile object that can be remotely operated, in order to remotely operate the mobile object.

Figure 12A:
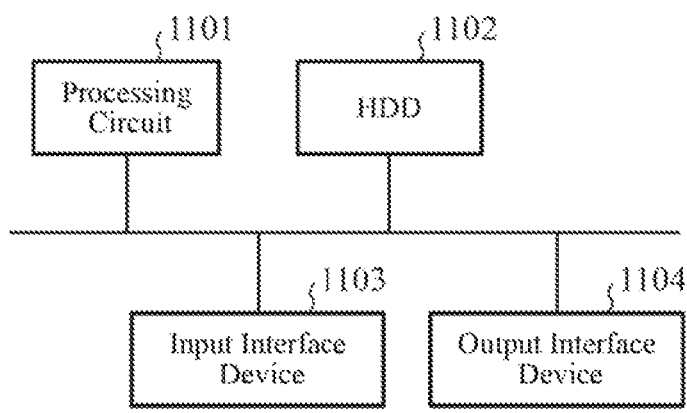
FIGS. 12A and 12B are diagrams showing an example of a hardware configuration of the remote operation device according to the first embodiment.
Figure 12B:
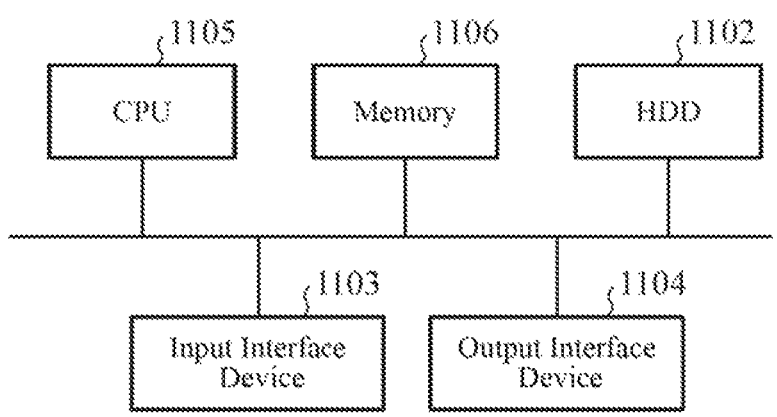

FIGS. 12A and 12B are diagrams showing an example of a hardware configuration of the remote operation device 1 according to the first embodiment.

In the first embodiment, the functions of the acquisition unit 11, the delay time detecting unit 12, the switching control unit 13, the operation control unit 14, the detection unit 15, and the output unit 16 are implemented by a processing circuit 1101. That is, the remote operation device 1 includes the processing circuit 1101 for performing control to switch the remote operation device 1 that remotely operates the vehicle 2 when the communication delay time in the communication between the remote operation device 1 and the vehicle 2 exceeds the delay time determination threshold during the remote operation of the vehicle 2.

The processing circuit 1101 may be dedicated hardware as shown in FIG. 12A, or may be a central processing unit (CPU) 1105 which executes a program stored in a memory 1106 as shown in FIG. 12B.

In a case where the processing circuit 1101 is dedicated hardware, the processing circuit 1101 may be, for example, a single circuit, a composite circuit, a programmed processor, a parallel-programmed processor, an application specific integrated circuit (ASIC), a field-programmable gate array (FPGA), or a combination thereof.

When the processing circuit 1101 is the CPU 1105, the functions of the acquisition unit 11, the delay time detecting unit 12, the switching control unit 13, the operation control unit 14, the detection unit 15, and the output unit 16 are implemented by software, firmware, or a combination of software and firmware. That is, the acquisition unit 11, the delay time detecting unit 12, the switching control unit 13, the operation control unit 14, the detection unit 15, and the output unit 16 are implemented by the CPU 1105 that executes a program stored in the memory 1106 or the like, or a processing circuit such as a system large-scale integration (LSI). It can also be said that the program stored in the memory 1106 or the like causes a computer to execute procedures and methods performed by the acquisition unit 11, the delay time detecting unit 12, the switching control unit 13, the operation control unit 14, the detection unit 15, and the output unit 16. Here, the memory 1106 is, for example, a nonvolatile or volatile semiconductor memory, such as a random access memory (RAM), a read only memory (ROM), a flash memory, an erasable programmable read only memory (EPROM), and an electrically erasable programmable read only memory (EEPROM), a magnetic disk, an optical disk, or the like.

Note that, the functions of the acquisition unit 11, the delay time detecting unit 12, the switching control unit 13, the operation control unit 14, the detection unit 15, and the output unit 16 may be partially implemented by dedicated hardware and partially implemented by software or firmware. For example, the functions of the acquisition unit 11 and the output unit 16 can be implemented by the processing circuit 1101 as dedicated hardware, and the functions of the delay time detecting unit 12, the switching control unit 13, the operation control unit 14, and the detection unit 15 can be implemented by the processing circuit 1101 reading and executing a program stored in the memory 1106.

The remote operation device 1 also includes an input interface device 1103 and an output interface device 1104 that communicate with the vehicle 2 or other remote operation devices 1. The communication unit (not illustrated) includes the input interface device 1103 and the output interface device 1104.

As described above, the remote operation device 1 according to the first embodiment is a remote operation device 1 capable of remotely operating a mobile object by communication, and includes: the acquisition unit 11 to acquire information on other remote operation devices 1 capable of remotely operating the mobile object by the communication; the delay time detecting unit 12 to detect a communication delay time in the communication with the mobile object; the delay time determining unit 131 to determine whether or not the communication delay time detected by the delay time detecting unit 12 exceeds a delay time determination threshold; the switching destination determining unit 132 to determine, when the delay time determining unit 131 determines that the communication delay time exceeds the delay time determination threshold, a switching destination remote operation device from among the other remote operation devices 1 depending on whether or not a switching determination condition is satisfied on a basis of the information on the other remote operation devices 1 acquired by the acquisition unit 11; and the switching control unit 13 to output switching instruction information for remotely operating the mobile object to the switching destination remote operation device determined by the switching destination determining unit 132. Therefore, the remote operation device 1 can prevent that the communication delay present in the communication for performing the remote operation of the vehicle 2 is increased to such an extent that the state in which the remote driving is normally performed cannot be maintained, and thus the state in which the remote driving is normally performed cannot be maintained.

In addition, the remote operation device 1 according to the first embodiment further includes: the operation control unit 14 to generate operation information for remotely operating the mobile object; the preparation operation information acquiring unit 114 to acquire, from the switching destination remote operation device, preparation operation information for remotely operating the mobile object, the preparation operation information being generated by the switching destination remote operation device; and the difference calculating unit 133 to calculate a difference between the operation information generated by the operation control unit 14 and the preparation operation information acquired by the preparation operation information acquiring unit 114, in which the switching control unit 13 is configured to output, when a state in which the difference calculated by the difference calculating unit 133 is within a difference determination threshold has continued for a difference continuation determination time, the switching instruction information to the switching destination remote operation device, and causes the operation control unit 14 not to generate the operation information. The remote operation device 1 does not need to stop the vehicle 2 before the remote operator after switching operates the remote operation device 1 after switching. As a result, the operation efficiency of the vehicle 2 can be improved.

In addition, even if the remote operation device 1 that remotely operates the vehicle 2 changes, in other words, even if the remote operator who operates the remote operation device 1 that remotely operates the vehicle 2 changes, the remote operation device 1 can reduce a sudden large change in the control amount of the vehicle 2.

It should be noted that the invention of the present application is capable of modifying any of the constituent elements of the embodiment or omitting any of the constituent elements of the embodiment within the scope of the invention.

INDUSTRIAL APPLICABILITY

Since the remote operation device according to the present invention is configured to be able to prevent that the communication delay present in the communication for performing the remote operation of the mobile object is increased to such an extent that the state in which the remote driving is normally performed cannot be maintained, and thus the state in which the remote driving is normally performed cannot be maintained, the remote operation device can be applied to a remote operation device that remotely operates the mobile object.

REFERENCE SIGNS LIST

1: remote operation device, 11: acquisition unit, 111: device information acquiring unit, 112: operator information acquiring unit, 113: vehicle information acquiring unit, 114: preparation operation information acquiring unit, 115: switching control information acquiring unit, 12: delay time detecting unit, 13: switching control unit, 131: delay time determining unit, 132: switching destination determining unit, 133: difference calculating unit, 14: operation control unit, 15: detection unit, 151: device information detecting unit, 152: operator information detecting unit, 16: output unit, 161: device information output unit, 162: operator information output unit, 163: switching control information output unit, 164: operation information output unit, 165: preparation operation information output unit, 1101: processing circuit, 1102: HDD, 1103: input interface device, 1104: output interface device, 1105: CPU, 1106: memory

The invention claimed is:

1. A remote operation device that remotely operates a mobile object by communication, the remote operation device comprising:
processing circuitry configured to
generate the operation information for remotely operating the mobile object;
acquire information on non-prime remote operation devices that are allowed to remotely operate the mobile object by the communication;
detect a communication delay time in the communication with the mobile object;
determine whether or not the detected communication delay time exceeds a delay time determination threshold;
determine, when it is determined that the communication delay time exceeds the delay time determination threshold, a switching destination remote operation device from among the non-prime remote operation devices depending on whether or not a switching determination condition is satisfied on a basis of the acquired information on the non-prime remote operation devices-; and
output switching instruction information for remotely operating the mobile object to the determined switching destination remote operation device-,
wherein, while the remote operation device is remotely controlling the mobile object as a switching source remote operation device, the switching source remote operation device causes the switching destination remote operation device to generate and send preparation operation information of the switching destination remote operation device to the switching source remote operation device, and instructs the switching destination remote operation device to take over remote operation of the mobile object only after a difference between the operation information and the preparation operation information continuously remains below a predetermined difference threshold for a predetermined time duration, to enable a transition of the switching source remote operation device without stopping the mobile object.

2. The remote operation device according to claim 1, wherein
the processing circuitry is further configured to acquire device state information on a communication delay times between each of the non-prime remote operation devices and the mobile object, and
the switching determination condition is that the acquired communication delay time between each of the non-prime remote operation devices and the mobile object is equal to or less than a non-prime device delay time determination threshold.

3. The remote operation device according to claim 2, wherein
the processing circuitry is further configured to acquire operator state information on states of remote operators who operate the non-prime remote operation devices, and
the switching determination condition is that the acquired states of the remote operators operating the non-prime remote operation devices indicate that the non-prime remote operation devices are successfully operated, and the acquired communication delay time between each of the non-prime remote operation devices and the mobile object is equal to or less than the non-prime device delay time determination threshold.

4. The remote operation device according to claim 1,
acquire, from the switching destination remote operation device, the preparation operation information for remotely operating the mobile object, the preparation operation information being generated by the switching destination remote operation device; and
calculate the difference between the generated operation information and the acquired preparation operation information,
wherein when a state in which the calculated difference is within the predetermined difference threshold has continued for the predetermined time duration, the processing circuitry outputs the switching instruction information to the switching destination remote operation device, and does not-generate the operation information.

5. A remote operation method by a remote operation device that remotely operates a mobile object by communication, the remote operation method comprising:
acquiring information on non-prime remote operation devices that are allowed to remotely operate the mobile object by the communication;
detecting a communication delay time in the communication with the mobile object;
determining whether or not the detected communication delay time exceeds a delay time determination threshold;
determining when it is determined that the communication delay time exceeds the delay time determination threshold, a switching destination remote operation device from among the non-prime remote operation devices depending on whether or not a switching determination condition is satisfied on a basis of the acquired information on the non-prime remote operation devices; and
outputting switching instruction information for remotely operating the mobile object to the determined switching destination remote operation device,
wherein, while the remote operation device is remotely controlling the mobile object as a switching source remote operation device, the switching source remote operation device causes the switching destination remote operation device to generate and send preparation operation information of the switching destination remote operation device to the switching source remote operation device, and instructs the switching destination remote operation device to take over remote operation of the mobile object only after a difference between the operation information and the preparation operation information continuously remains below a predetermined difference threshold for a predetermined time duration, to enable a transition of the switching source remote operation device without stopping the mobile object.

* * * * *